(12) United States Patent
Murakami et al.

(10) Patent No.: US 10,976,209 B2
(45) Date of Patent: Apr. 13, 2021

(54) TORQUE SENSOR AND ELECTRIC POWER STEERING APPARATUS

(71) Applicant: HITACHI AUTOMOTIVE SYSTEMS, LTD., Hitachinaka (JP)

(72) Inventors: Hiroki Murakami, Atsugi (JP); Kohtaro Shiino, Isehara (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 633 days.

(21) Appl. No.: 15/578,846

(22) PCT Filed: Jun. 13, 2016

(86) PCT No.: PCT/JP2016/067518
§ 371 (c)(1),
(2) Date: Dec. 1, 2017

(87) PCT Pub. No.: WO2016/195120
PCT Pub. Date: Dec. 8, 2016

(65) Prior Publication Data
US 2018/0180498 A1      Jun. 28, 2018

(30) Foreign Application Priority Data

Jun. 2, 2015 (JP) .............................. JP2015-112271

(51) Int. Cl.
*G01L 3/10* (2006.01)
*B62D 5/04* (2006.01)
(Continued)

(52) U.S. Cl.
CPC .............. *G01L 3/104* (2013.01); *B62D 5/049* (2013.01); *B62D 5/0421* (2013.01);
(Continued)

(58) Field of Classification Search
CPC ...... B62D 5/04; B62D 5/0421; B62D 5/0463; B62D 5/0484; B62D 5/049; B62D 6/10;
(Continued)

(56) References Cited

U.S. PATENT DOCUMENTS

| 6,880,411 | B2 * | 4/2005 | Nakane | ..................... B62D 6/10 |
| | | | | 73/862.331 |
| 6,912,923 | B2 * | 7/2005 | Froehlich | ................. G01L 3/104 |
| | | | | 73/862.331 |

(Continued)

FOREIGN PATENT DOCUMENTS

| JP | 3874642 B2 | 1/2007 |
| JP | 2010-203960 A | 9/2010 |
| JP | 2014-055910 A | 3/2014 |

*Primary Examiner* — Ruth Ilan
*Assistant Examiner* — Maurice L Williams
(74) *Attorney, Agent, or Firm* — Foley & Lardner LLP

(57) ABSTRACT

A torque sensor is configured to detect torque even when an abnormality has occurred in one magnetic sensor among multiple magnetic sensors. An electric power steering apparatus using the torque sensor is provided. The torque sensor includes a first magnetic sensor between a first magnetic collection mechanism and a second magnetic collection mechanism, a second magnetic sensor between the first and second magnetic collection mechanisms and disposed at a same position as or a symmetric position to a magnetic environment of the first magnetic sensor, and a third magnetic sensor between the first and second magnetic collection mechanisms and disposed at a same position as or a symmetric position to the magnetic environments of the first and second magnetic sensors. The torque sensor detects torque generated on a rotational member based on an output signal of the first, second, or third magnetic sensor.

19 Claims, 15 Drawing Sheets

(51) Int. Cl.
*B62D 6/10* (2006.01)
*G01L 5/22* (2006.01)

(52) U.S. Cl.
CPC ......... *B62D 5/0463* (2013.01); *B62D 5/0484* (2013.01); *B62D 6/10* (2013.01); *G01L 5/221* (2013.01)

(58) Field of Classification Search
CPC .............. B62D 15/021; B62D 15/0215; B62D 15/022; G01L 3/04; G01L 3/10; G01L 3/104; B60Y 2400/307
See application file for complete search history.

(56) References Cited

U.S. PATENT DOCUMENTS

| | | | | |
|---|---|---|---|---|
| 7,028,545 B2* | 4/2006 | Gandel | ................ | G01L 3/104 73/328 |
| 7,047,824 B2 | 5/2006 | Nakane et al. | | |
| 7,293,472 B2* | 11/2007 | Tokumoto | ............... | G01L 3/104 73/862.08 |
| 7,845,244 B2* | 12/2010 | Aoki | ................ | G01L 3/104 73/862.331 |
| 8,800,388 B2* | 8/2014 | Takahashi | ............... | G01L 3/101 73/862.331 |
| 8,915,150 B2* | 12/2014 | Shimomura | ............ | G01L 3/104 73/862 |
| 9,302,700 B2 | 4/2016 | Yoshida et al. | | |
| 2008/0258715 A1* | 10/2008 | Reichert | ................. | G01L 5/221 324/207.13 |
| 2013/0118273 A1* | 5/2013 | Antoni | .................... | F16C 33/78 73/862.08 |
| 2014/0076654 A1* | 3/2014 | Yoshida | ............... | B62D 5/0463 180/446 |
| 2014/0130612 A1* | 5/2014 | Takahashi | ............... | G01L 3/104 73/862.193 |
| 2014/0331788 A1* | 11/2014 | Ishimoto | ................ | G01L 5/221 73/862.325 |
| 2015/0330849 A1* | 11/2015 | Matsui | .................... | G01L 3/101 73/862.331 |
| 2015/0369679 A1* | 12/2015 | Ishimoto | ................ | G01L 3/101 73/862.331 |

* cited by examiner

A-A

TORQUE SENSOR AND ELECTRIC POWER STEERING APPARATUS

TECHNICAL FIELD

The present invention relates to a torque sensor and an electric power steering apparatus.

BACKGROUND ART

As this kind of technique, there is disclosed a technique discussed in the following patent literature, PTL 1. PTL 1 discloses a torque sensor using two magnetic sensors.

CITATION LIST

Patent Literature

PTL 1: Japanese Patent Application Publication No. 2014-55910

SUMMARY OF INVENTION

Technical Problem

However, the technique disclosed in PTL 1 uses the two magnetic sensors, so that, when an abnormality has occurred in one of the magnetic sensors, this technique can determine that any one of the magnetic sensors has an abnormality therein but cannot determine which magnetic sensor has the abnormality therein. Therefore, this technique has such a problem that the torque sensor cannot detect a torque even when the abnormality has occurred in one magnetic sensor.

An object of the present invention is to provide a torque sensor capable of detecting a torque even when an abnormality has occurred in one magnetic sensor among a plurality of magnetic sensors, and an electric power steering apparatus using the torque sensor.

Solution to Problem

To achieve the above-described object, according to one aspect of the present invention, a torque sensor includes a first magnetic sensor provided between a first magnetic collection mechanism and the second magnetic collection mechanism, a second magnetic sensor provided between the first magnetic collection mechanism and the second magnetic collection mechanism and disposed at a same position as or a symmetric position to a magnetic environment of the first magnetic sensor, and a third magnetic sensor provided between the first magnetic collection mechanism and the second magnetic collection mechanism and disposed at a same position as or a symmetric position to the magnetic environment of the first magnetic sensor and a magnetic environment of the second magnetic sensor. This torque sensor detects a torque generated on a rotational member based on an output signal of the first magnetic sensor, the second magnetic sensor, or the third magnetic sensor.

According to the aspect of the present invention, the torque can be detected even when the abnormality has occurred in the one magnetic sensor among the plurality of magnetic sensors.

DESCRIPTION OF EMBODIMENTS

First Embodiment

[Configuration of Electric Power Steering]

Figure 1:
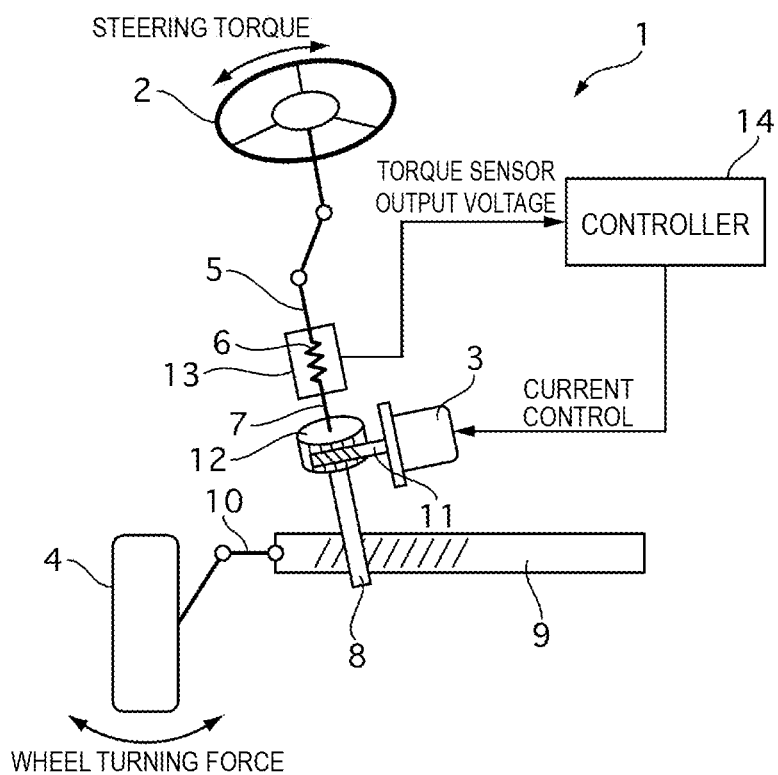
FIG. 1 illustrates an overall configuration of an electric power steering apparatus according to a first embodiment.

FIG. 1 illustrates an overall configuration of an electric power steering apparatus 1. The electric power steering apparatus 1 adds an assist torque with use of an electric motor 3 to a steering torque input from a driver to a steering wheel 2, and transmits the steering torque and the assist torque to a turning target wheel 4 as a wheel turning force.

The steering torque input to the steering wheel 2 is transmitted to the turning target wheel 4 via an input shaft 5, a torsion bar 6, a pinion shaft 7, a pinon 8, a rack bar 9, and a tie rod 10. The input shaft 5, the torsion bar 6, the pinion shaft 7, the pinon 8, the rack bar 9, and the tie rod 10 form a steering mechanism 17.

The assist torque output from the electric motor 3 is transmitted to the turning target wheel 4 via a worm shaft 11, a worm wheel 12, the pinon 8, the rack bar 9, and the tie rod 10.

A torque sensor 13, which detects the steering torque, is provided so as to extend over the input shaft 5 and the pinion shaft 7. The torque sensor 13 outputs a torque sensor output voltage according to the steering torque to a controller 14. The controller 14 calculates a target output torque of the electric motor 3 according to the torque sensor output voltage, and controls a current driving the electric motor 3, according to the target output torque.

The input shaft 5 and the pinion shaft 7 form a rotational member 16.

[Configuration of Torque Sensor]

Figure 2:
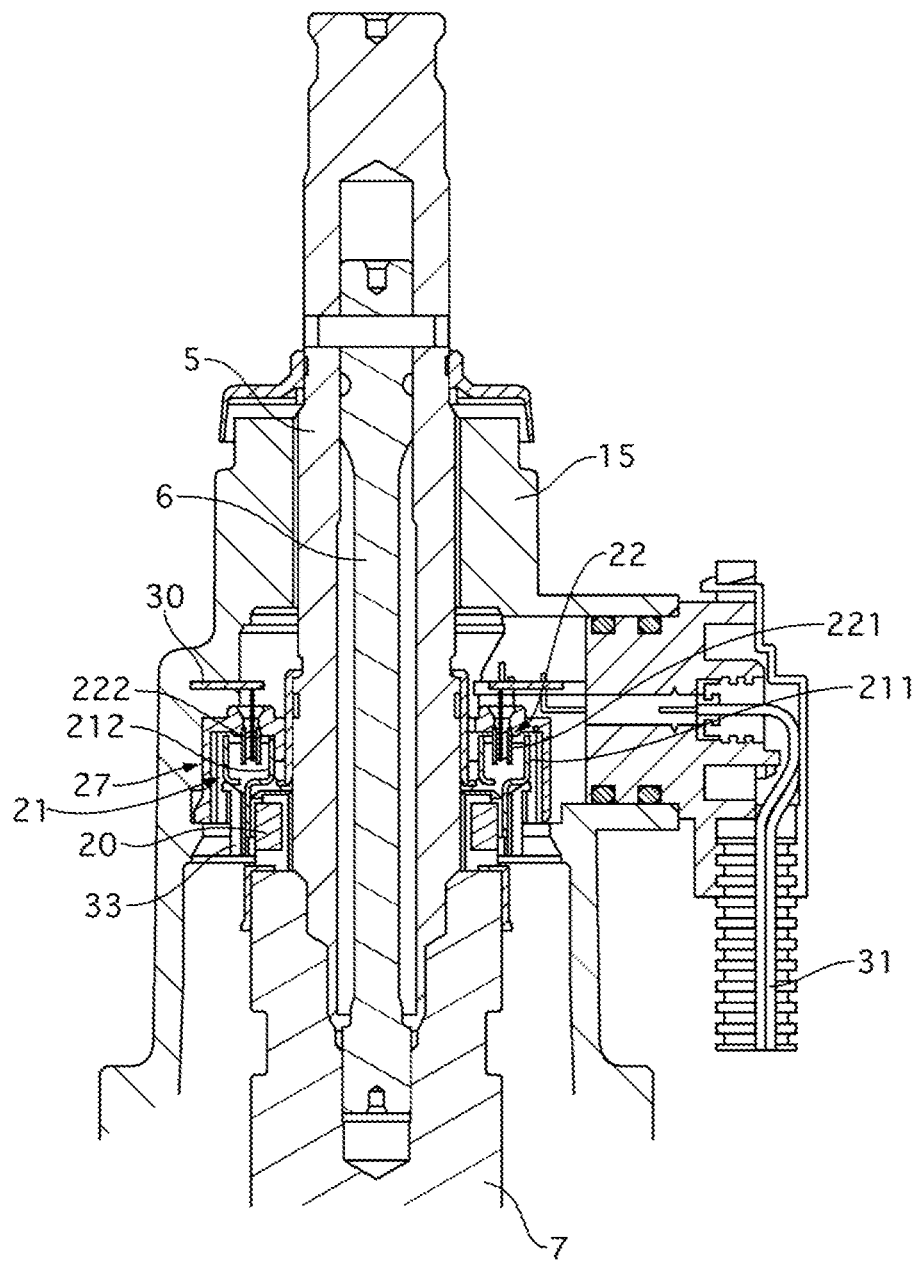
FIG. 2 is an axial cross-sectional view of a torque sensor according to the first embodiment.
Figure 3:
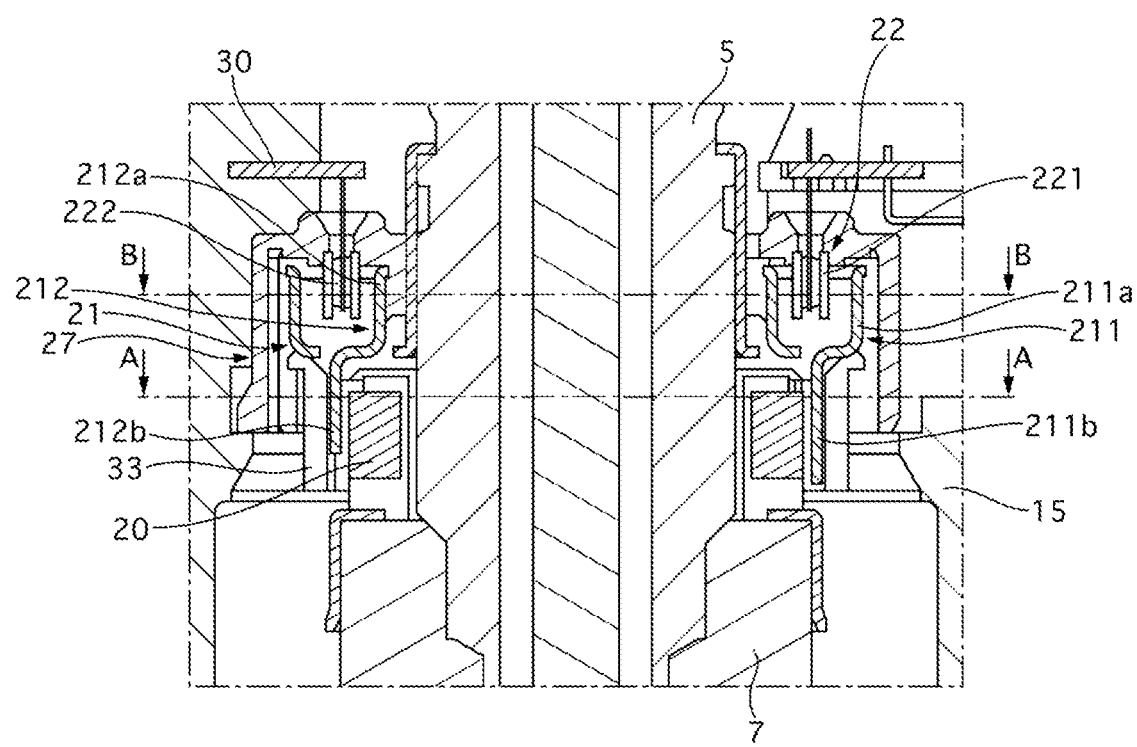
FIG. 3 is an axial cross-sectional view of the torque sensor according to the first embodiment.
Figure 4:
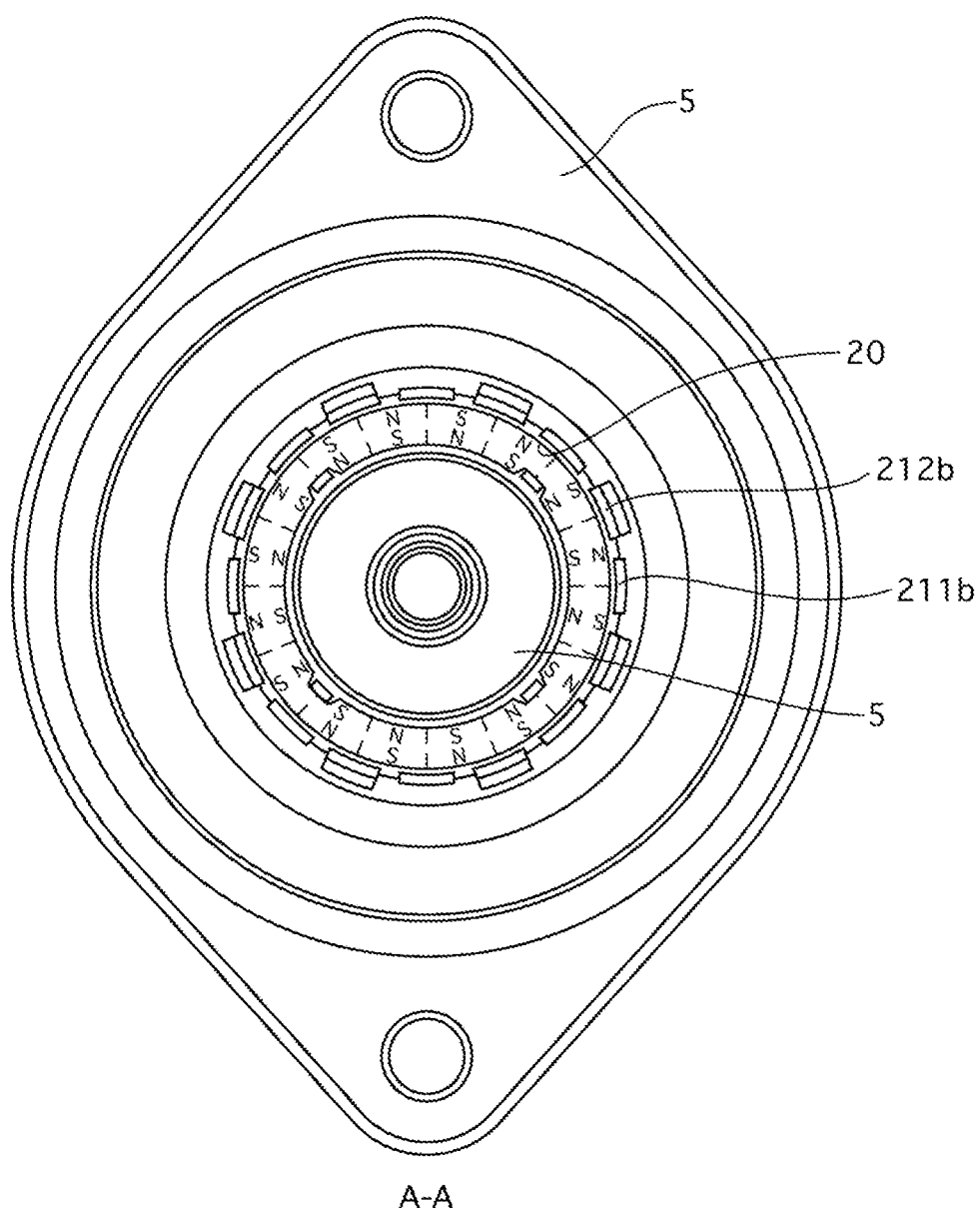
FIG. 4 is a radial cross-sectional view of the torque sensor according to the first embodiment.
Figure 5:
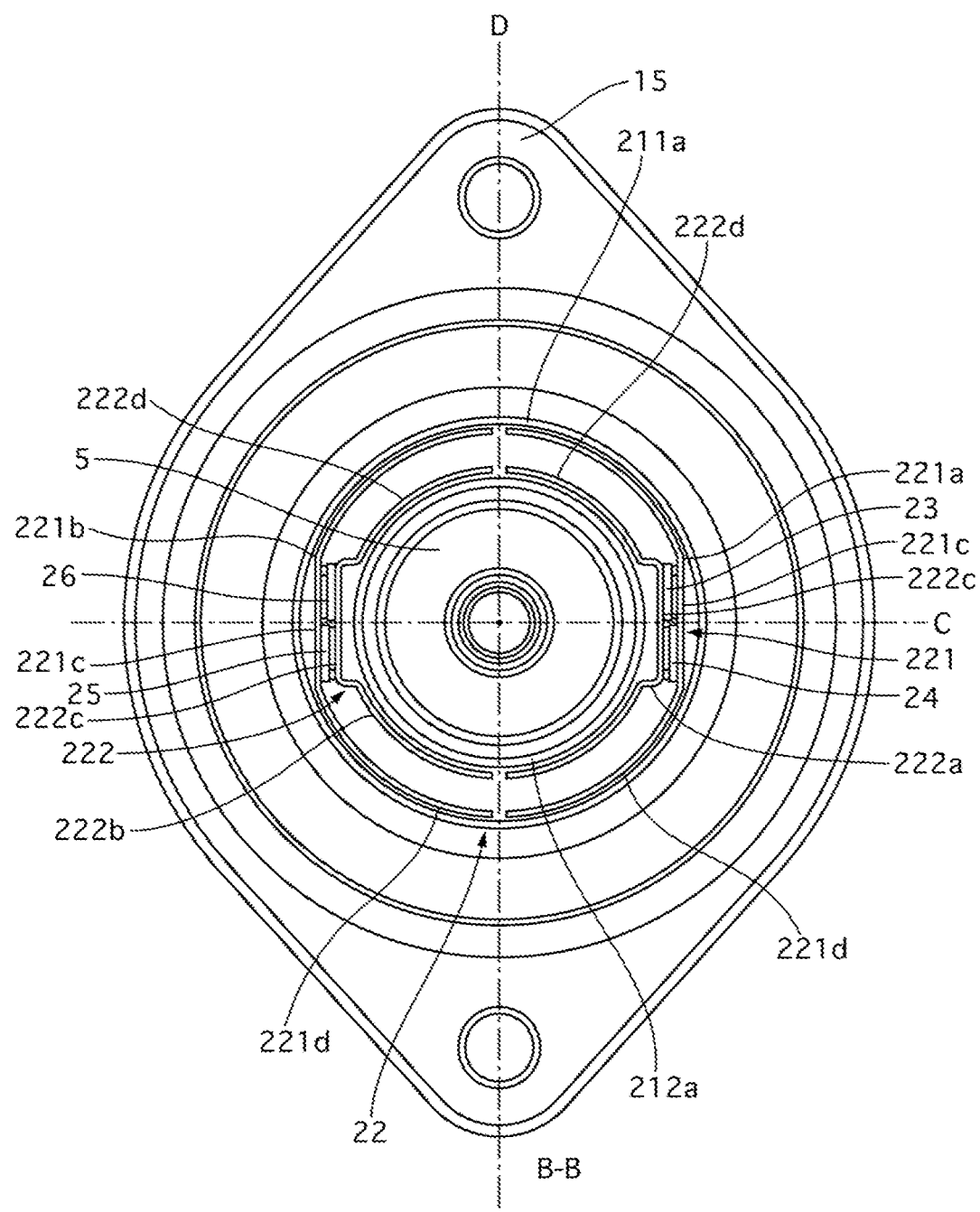
FIG. 5 is a radial cross-sectional view of the torque sensor according to the first embodiment.

FIG. 2 is an axial cross-sectional view around the torque sensor 13. FIG. 3 is an enlarged view of a portion of the torque sensor 13. FIG. 4 is a cross-sectional view taken along a line A-A illustrated in FIG. 3. FIG. 5 is a cross-sectional view taken along a line B-B illustrated in FIG. 3.

Figure 6:
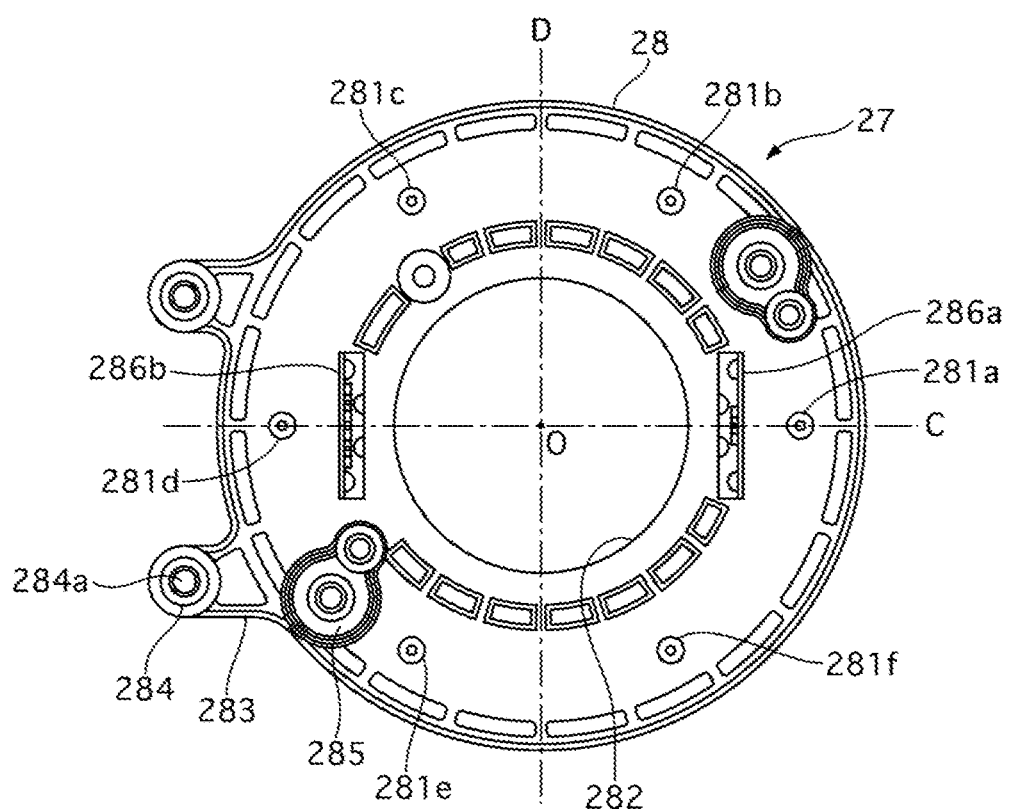
FIG. 6 illustrates a magnetic collection unit according to the first embodiment as viewed from an axial direction.
Figure 7:
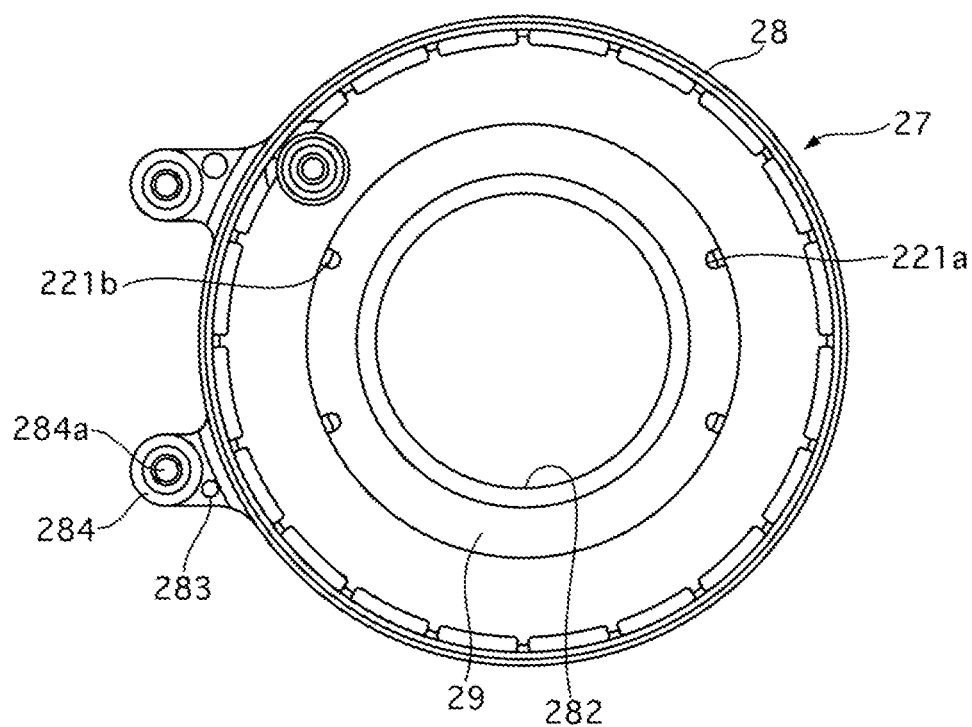
FIG. 7 illustrates the magnetic collection unit according to the first embodiment as viewed from the axial direction.
Figure 8:
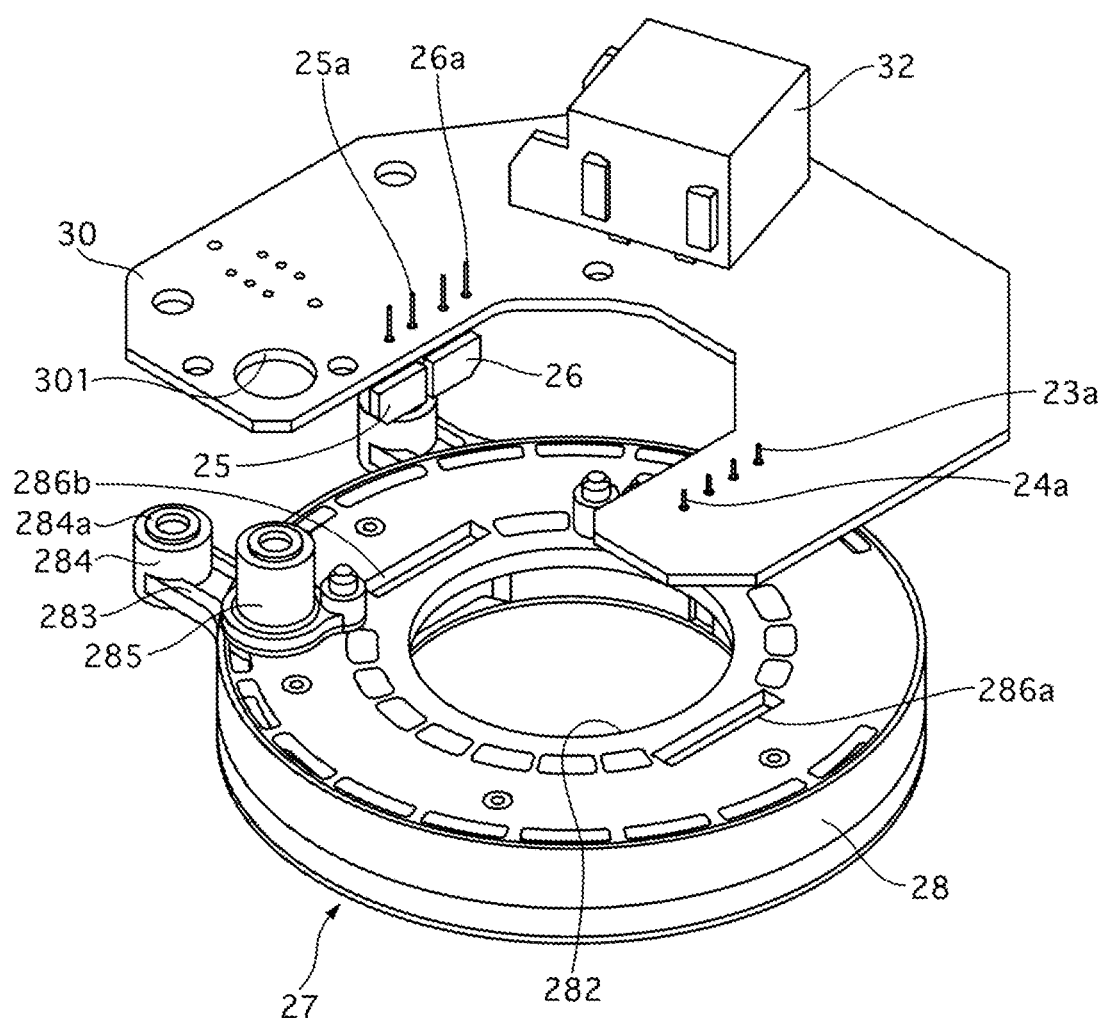
FIG. 8 is a perspective view of the magnetic collection unit and a circuit substrate according to the first embodiment.

FIG. 6 illustrates a magnetic collection unit 27 as viewed from the steering wheel 2 side. FIG. 7 illustrates the magnetic collection unit 27 as viewed from the pinion 8 side. FIG. 8 is a perspective view of the magnetic collection unit 27 and a circuit substrate 30.

The torque sensor 13 is contained in a steering gear box 15. One end of the torsion bar 6 is fixed to the input shaft 5. The other end of the torsion bar 6 is fixed to the pinion shaft 7. The input shaft 5 and the pinion shaft 7 are not directly coupled with each other, and they are supported rotatably relative to each other. When the steering torque is input, the torsion bar 6 is twisted, and a difference is generated in a rotational amount between the input shaft 5 and the pinion shaft 7. The torque sensor 13 calculates the steering torque from how large this difference is.

(Magnet)

An annularly formed magnet 20 is provided on the pinion shaft 7. The magnet 20 is disposed in such a manner that N poles and S poles are arranged alternately in a circumferential direction. In the first embodiment, the magnet 20 includes sixteen poles in the circumferential direction. The magnet 20 rotates integrally with the pinion shaft 7.

(Yoke Member)

A yoke member 21 is provided on the input shaft 5. The yoke member 21 includes a first yoke member 211 and a second yoke member 212.

The first yoke member 211 is made from a permalloy (a soft magnetic alloy). The first yoke member 211 includes an annularly formed first annular portion 211a. The first annular portion 211a is formed so as to have a larger diameter than an outer diameter of the magnet 20. The first yoke member 211 includes first claw portions 211b axially extending after being bent from the first annular portion 211a toward an inner peripheral side. Eight first claw portions 211b are provided at even intervals in the circumferential direction. The first claw portions 211b are formed in such a manner that the interval between the first claw portions 211b adjacent to each other approximately matches or slightly exceeds a width of the first claw portion 211b in the circumferential direction. The first claw portions 211b are formed in such a manner that a diameter of a circle defined by connecting outer peripheral surfaces of the first claw portions 211b in the circumferential direction exceeds the outer diameter of the magnet 20.

The second yoke member 212 is made from a permalloy. The second yoke member 212 includes an annularly formed second annular portion 212a. The second annular portion 212a is formed so as to have a smaller diameter than the outer diameter of the magnet 20. The second yoke member 212 includes second claw portions 212b axially extending after being bent from the second annular portion 212a toward an outer peripheral side. Eight second claw portions 212b are provided at even intervals in the circumferential direction. The second claw portions 212b are formed in such a manner that the interval between the second claw portions 212b adjacent to each other approximately matches or slightly exceeds a width of the second claw portion 212b in the circumferential direction. The second claw portions 212b are formed in such a manner that a diameter of a circle defined by connecting outer peripheral surfaces of the second claw portions 212b in the circumferential direction approximately matches the diameter of the circle defined by connecting the outer peripheral surfaces of the first claw portions 211b in the circumferential direction.

The first yoke member 211 and the second yoke member 212 are held by a yoke holder 33. With the first yoke member 211 and the second yoke member 212 held by the yoke holder 33, the first annular portion 211a and the second annular portion 212a are coaxially disposed and the first annular portion 211a is located on the outer peripheral side of the second annular portion 212a. The first annular portion 211a and the second annular portion 212a are provided in such a manner that an inner peripheral surface of the first annular portion 211a and an outer peripheral surface of the second annular portion 212a face each other. The first annular portion 211a and the second annular portion 212a are provided in such a manner that the inner peripheral surface of the first annular portion 211a and the outer peripheral surface of the second annular portion 212a are spaced apart from each other. The first yoke member 211 and the second yoke member 212 are arranged in such a manner that the second claw portion 212b is located between the adjacent first claw portions 211b with the first yoke member 211 and the second yoke member 212 held by the yoke holder 33. In other words, the first claw portions 211b and the second claw portions 212b are alternately disposed.

The first yoke member 211 and the second yoke member 212 are mounted to the input shaft 5 with them held by the yoke holder 33. The first yoke member 211 and the second yoke member 212 rotate integrally with the input shaft 5. The first claw portions 211b and the second claw portions 212b are disposed on an outer peripheral side of the magnet 20. The first claw portions 211b and the second claw portions 212b are disposed in such a manner that a central position of each of them in a width direction faces a boundary position between the N pole and the S pole of the magnet 20 at this time.

(Magnetic Collection Mechanism)

A magnetic collection mechanism 22 is provided between the first annular portion 211a of the first yoke member 211 and the second annular portion 212a of the second yoke member 212. The magnetic collection mechanism 22 includes a first magnetic collection mechanism 221 and a second magnetic collection mechanism 222.

The first magnetic collection mechanism 221 is made from a permalloy. The first magnetic collection mechanism 221 is disposed so as to face the first annular portion 211a. The first magnetic collection mechanism 221 is disposed so as to be spaced apart from the first annular portion 211a.

The first magnetic collection mechanism 221 includes a first magnetic collection member 221a and a second magnetic collection member 221b. The first magnetic collection member 221a and the second magnetic collection member 221b are formed into identical shapes to each other. The first magnetic collection member 221a and the second magnetic collection member 221b each include a linearly formed magnetic collection portion 221c and circular arc portions 221d extending from both ends of the magnetic collection portion 221c in a circular arc manner when the first magnetic collection member 221a and the second magnetic collection member 221b are viewed from a rotational axis direction of the input shaft 5. The magnetic collection portion 221c is formed so as to be located on an inner peripheral side of a virtual circle defined by extending the circular arc portions 221d. The first magnetic collection member 221a and the second magnetic collection member 221b are each formed into a circular arc shape along a circumferential direction of a rotational axis of the input shaft 5 as a whole. The first magnetic collection member 221a and the second magnetic collection member 221b are formed in such a manner that a width of each of them in the circumferential direction of the rotational axis of the input shaft 5 slightly falls below 180 degrees. The first magnetic collection member 221a and the second magnetic collection member 221b are disposed in such a manner that ends thereof in the circumferential direction are out of contact with each other. The first magnetic collection member 221a and the second magnetic collection member 221b are each a plate-like member having a width in the rotational axis direction of the input shaft 5. In other words, the first magnetic collection member 221a and the second magnetic collection member 221b are disposed so as to overlap the first annular portion 211a in the rotational axis direction and the circumferential direction of the input shaft 5.

The second magnetic collection mechanism 222 is made from a permalloy. The second magnetic collection mechanism 222 is disposed so as to face the second annular portion 212a. The second magnetic collection mechanism 222 is disposed so as to be spaced apart from the second annular portion 212a.

The second magnetic collection mechanism 222 includes a third magnetic collection member 222a and a fourth magnetic collection member 222b. The third magnetic collection member 222a and the fourth magnetic collection member 222b are formed into identical shapes to each other. The third magnetic collection member 222a and the fourth magnetic collection member 222b each include a linearly formed magnetic collection portion 222c and circular arc portions 222d extending from the magnetic collection portion 222c in a circular arc manner when the third magnetic collection member 222a and the fourth magnetic collection member 222b are viewed from the rotational axis direction of the input shaft 5. The magnetic collection portion 221c is formed so as to be located on an outer peripheral side of a virtual circle defined by extending the circular arc portion 221d. The third magnetic collection member 222a and the fourth magnetic collection member 222b are each formed into a circular arc shape along the circumferential direction of the rotational axis of the input shaft 5 as a whole. The third magnetic collection member 222a and the fourth magnetic collection member 222b are formed in such a manner that a width of each of them in the circumferential direction of the rotational axis of the input shaft 5 slightly falls below 180 degrees. The third magnetic collection member 222a and the fourth magnetic collection member 222b are disposed in such a manner that ends thereof in the circumferential direction are out of contact with each other. The third magnetic collection member 222a and the fourth magnetic collection member 222b are each a plate-like member having a width in the rotational axis direction of the input shaft 5. In other words, the third magnetic collection member 222a and the fourth magnetic collection member 222b are disposed so as to overlap the second annular portion 212a in the rotational axis direction and the circumferential direction of the input shaft 5.

The first magnetic collection member 221a, the second magnetic collection member 221b, the third magnetic collection member 222a, and the fourth magnetic collection member 222b are provided on the same plane orthogonal to the rotational axis of the input shaft 5.

In FIG. 5, a straight line C is defined to be a straight line orthogonal to the rotational axis O of the input shaft 5 and also orthogonal to the magnetic collection portion 221c of the first magnetic collection member 221a, the magnetic collection portion 221c of the second magnetic collection member 221b, the magnetic collection portion 222c of the third magnetic collection member 222a, and the magnetic collection portion 222c of the fourth magnetic collection member 222b. Further, a straight line D is defined to be a straight line orthogonal to the rotational axis O of the input shaft 5 and also in parallel with the magnetic collection portion 221c of the first magnetic collection member 221a, the magnetic collection portion 221c of the second magnetic collection member 221b, the magnetic collection portion 222c of the third magnetic collection member 222a, and the magnetic collection portion 222c of the fourth magnetic collection member 222b.

The first magnetic collection member 221a, the second magnetic collection member 221b, the third magnetic collection member 222a, and the fourth magnetic collection member 222d are each formed into a shape symmetric with respect to the straight line C. The first magnetic collection member 221a and the second magnetic collection member 221b are disposed so as to have a shape symmetric with respect to the straight line D. The third magnetic collection member 222a and the fourth magnetic collection member 222b are disposed so as to have a shape symmetric with respect to the straight line D.

The first magnetic collection member 221a and the second magnetic collection member 221b are disposed so as to have a shape symmetric with respect to the rotational axis O of the input shaft 5. The third magnetic collection member 222a and the fourth magnetic collection member 222b are disposed so as to have a shape symmetric with respect to the rotational axis O of the input shaft 5.

The magnetic collection mechanism 22 is held by a holder member 28 formed by injection molding from a resin material that is an insulating member. The magnetic collection mechanism 22 is formed integrally with the holder member 28 by insert molding. The holder member 28 and the magnetic collection member 22 form the magnetic collection unit 27.

The holder member 28 has an outer shape formed into a generally bottomed cup shape, and includes an opening portion 282 at a center of a bottom portion thereof. The input shaft 5 penetrates through this opening portion 282. Gate portions 281 are provided on a bottom surface of the holder member 28. The resin material is injected through the gate portions 281 when the holder member 28 is formed by the injection molding. There are six gate portions 281 (gate portions 281a, 281b, 281c, 281d, 281e, and 281f). The six gate portions 281 are provided at positions symmetric with respect to the straight line C and the straight line D. In other words, the gate portions 281 are also provided at positions symmetric with respect to the first magnetic collection mechanism 221 and the second magnetic collection mechanism 222.

A flange portion 283 protrudes from an outer peripheral surface of the holder member 28, and a columnar portion 284 having a column-like shape is formed at a distal end of the flange portion 283. A bolt hole 284a is formed in the columnar portion 284. A bolt for fixing the magnetic collection unit 27 to the steering gear box 15 is inserted in the bolt hole 284a.

A columnar positioning portion 285 is provided so as to protrude from a surface that is the bottom portion of the holder member 28 and would be located on the steering wheel 2 side when the magnetic collection unit 27 is mounted in the steering gear box 15. The positioning portion 285 is inserted in a positioning hole 301 of the circuit substrate 30, which will be described below, and positions the circuit substrate 30 relative to the magnetic collection unit 27.

A magnetic sensor insertion hole 286a and a magnetic sensor insertion hole 286b are formed at the bottom portion of the holder member 28. The magnetic sensor insertion hole 286a is in communication with between the magnetic collection portion 221c of the first magnetic collection member 221a and the magnetic collection portion 222c of the third magnetic collection member 222a. The magnetic sensor insertion hole 286b is in communication with between the magnetic collection portion 221c of the second magnetic collection member 221b and the magnetic collection portion 222c of the fourth magnetic collection member 222b. A first magnetic sensor 23 and a second magnetic sensor 24, which will be described below, are inserted from the magnetic sensor insertion hole 286a into between the magnetic collection portion 221c of the first magnetic collection member 221a and the magnetic collection portion 222c of the third magnetic collection member 222a. A third magnetic sensor 25 and a fourth magnetic sensor 26, which will be described below, are inserted from the magnetic sensor insertion hole 286b into between the magnetic collection portion 221c of the second magnetic collection member 221b and the magnetic collection portion 222c of the fourth magnetic collection member 222b.

Portions of the first magnetic collection mechanism 221 and the second magnetic collection mechanism 222 that are inserted between the first annular portion 211a of the first yoke member 211 and the second annular portion 212a of the second yoke member 212 are exposed without being covered by the resin member forming the holder member 28. A welded plate 29 is provided so as to extend over the first magnetic collection mechanism 221 and the second magnetic collection mechanism 222 arranged adjacent to each other. The welded plate 29 is formed into an annular shape with use of thermoplastic resin. The welded plate 29 is ultrasonically welded while being in abutment with the first magnetic collection mechanism 221 and the second magnetic collection mechanism 222.

(Magnetic Sensor)

The first magnetic sensor 23 and the second magnetic sensor 24 are provided between the magnetic collection portion 221c of the first magnetic collection member 221a and the magnetic collection portion 222c of the third magnetic collection member 222a. The third magnetic sensor 25 and the fourth magnetic sensor 26 are provided between the magnetic collection portion 221c of the second magnetic collection member 221b and the magnetic collection portion 222c of the fourth magnetic collection member 222b. The first magnetic sensor 23, the second magnetic sensor 24, the third magnetic sensor 25, and the fourth magnetic sensor 26 are each made of a Hall element.

The first magnetic sensor 23 and the second magnetic sensor 24 are disposed at positions that allow them to be symmetric with respect to the straight line C. The third magnetic sensor 25 and the fourth magnetic sensor 26 are disposed at positions that allow them to be symmetric with respect to the straight line C. The first magnetic sensor 23 and the fourth magnetic sensor 26 are disposed at positions that allow them to be symmetric with respect to the straight line D. The second magnetic sensor 24 and the third magnetic sensor 25 are disposed at positions that allow them to be symmetric with respect to the straight line D. The first magnetic sensor 23 and the third magnetic sensor 25 are provided at positions that allow them to be symmetric with respect to the rotational axis O of the input shaft 5. The second magnetic sensor 24 and the fourth magnetic sensor 26 are provided at positions that allow them to be symmetric with respect to the rotational axis O of the input shaft 5.

In other words, the positions at which the first magnetic sensor 23, the second magnetic sensor 24, the third magnetic sensor 25, and the fourth magnetic sensor 26 are disposed are located in such a manner that magnetic environments (the positions of the magnet 20 and the claw portions 211b and 212b of the yoke member 21, positions relative to the magnetic collection member 22, and the like) match one another. Each of the first magnetic sensor 23, the second magnetic sensor 24, the third magnetic sensor 25, and the fourth magnetic sensor 26 detects a different magnetic flux line, but can detect a magnetic flux line having the same characteristic. Therefore, values detected by the first magnetic sensor 23, the second magnetic sensor 24, the third magnetic sensor 25, and the fourth magnetic sensor 26 match one another.

The first magnetic sensor 23, the second magnetic sensor 24, the third magnetic sensor 25, and the fourth magnetic sensor 26 include output terminals 23a, 24a, 25a, and 26a for outputting signals, respectively. The first magnetic sensor 23, the second magnetic sensor 24, the third magnetic sensor 25, and fourth magnetic sensor 26 are disposed with the output terminals 23a, 24a, 25a, and 26a extending in the same direction in the rotational axis direction of the input shaft 5. The output terminals 23a, 24a, 25a, and 26a are connected to the same circuit substrate 30. The first magnetic sensor 23, the second magnetic sensor 24, the third magnetic sensor 25, and the fourth magnetic sensor 26 are inserted in the magnetic sensor insertion holes 286a and 286b of the holder member 28 while being mounted to the circuit substrate 30.

A connector portion 32 is provided on the circuit substrate 30. A harness 31 connected to an external controller 14, which will be described below, is attached to the connector portion 32. The output signals of the first magnetic sensor 23, the second magnetic sensor 24, the third magnetic sensor 25, and the fourth magnetic sensor 26 are output from the connector portion 32 to the controller 14.

[Circuit Configuration]

Figure 9:
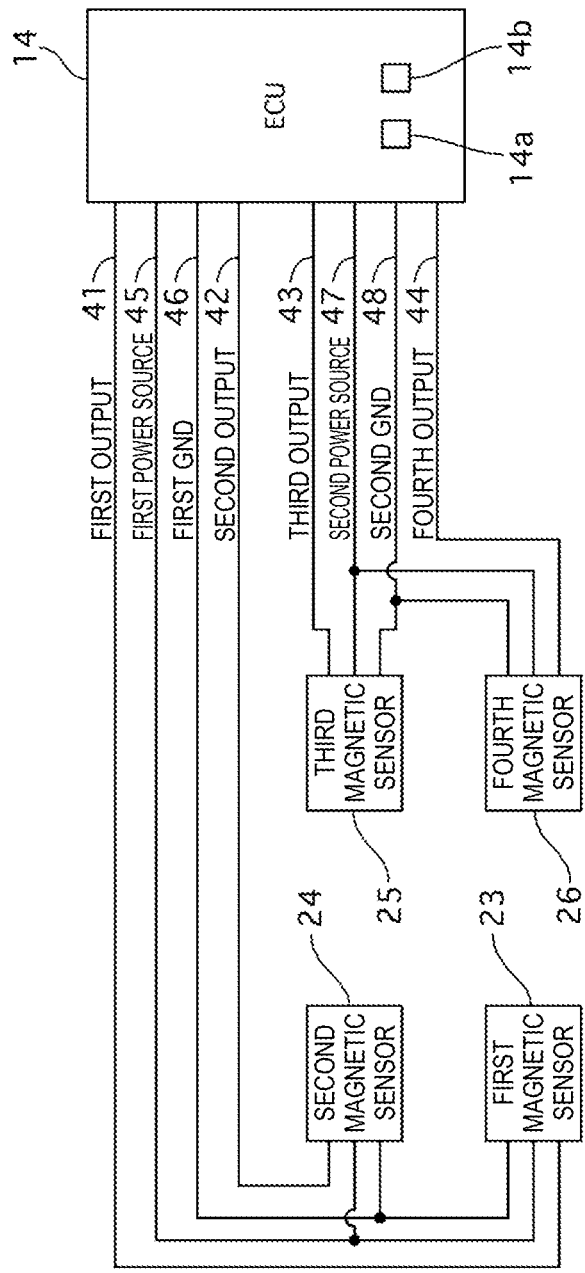
FIG. 9 illustrates a circuit between a magnetic sensor and a controller according to the first embodiment.

FIG. 9 illustrates a circuit between the first magnetic sensor 23, the second magnetic sensor 24, the third magnetic sensor 25, and the fourth magnetic sensor 26, and the controller 14.

The first magnetic sensor 23, the second magnetic sensor 24, the third magnetic sensor 25, and the fourth magnetic sensor 26 are connected to the controller 14 via a first output circuit 41, a second output circuit 42, a third output circuit 43, and a fourth output circuit 44, respectively. The first output circuit 41, the second output circuit 42, the third output circuit 43, and the fourth output circuit 44 transmit the output signals of the first magnetic sensor 23, the second magnetic sensor 24, the third magnetic sensor 25, and the fourth magnetic sensor 26 to the controller 14, respectively.

The first magnetic sensor 23 and the second magnetic sensor 24 are connected to the controller 14 via a common first power source circuit 45. Further, the third magnetic sensor 25 and the fourth magnetic sensor 26 are connected to the controller 14 via a common second power source circuit 47. The first power source circuit 45 and the second power source circuit 47 supply power to the first magnetic sensor 23 and the second magnetic sensor 24, and the third magnetic sensor 25, and the fourth magnetic sensor 26, respectively.

The first magnetic sensor 23 and the second magnetic sensor 24 are connected to the controller 14 via a common first ground circuit 46. Further, the third magnetic sensor 25 and the fourth magnetic sensor 26 are connected to the controller 14 via a common second ground circuit 48. The first ground circuit 46 and the second ground circuit 48 connect the first magnetic sensor 23, the second magnetic sensor 24, the third magnetic sensor 25 and the fourth magnetic sensor 26 to the ground.

The controller 14 includes an abnormality detection portion 14a, which detects an abnormality in the first power source circuit 45, the first ground circuit 46, the second power source circuit 47, and the second ground circuit 48.

[Output Adjustment Control]

The controller 14 includes an output adjustment portion 14b. The output adjustment portion 14b reduces a difference in the output signal that is generated due to an error for each product and an error in the mounting position between the first magnetic sensor 23, the second magnetic sensor 24, the third magnetic sensor 25, and the fourth magnetic sensor 26.

Figure 10:
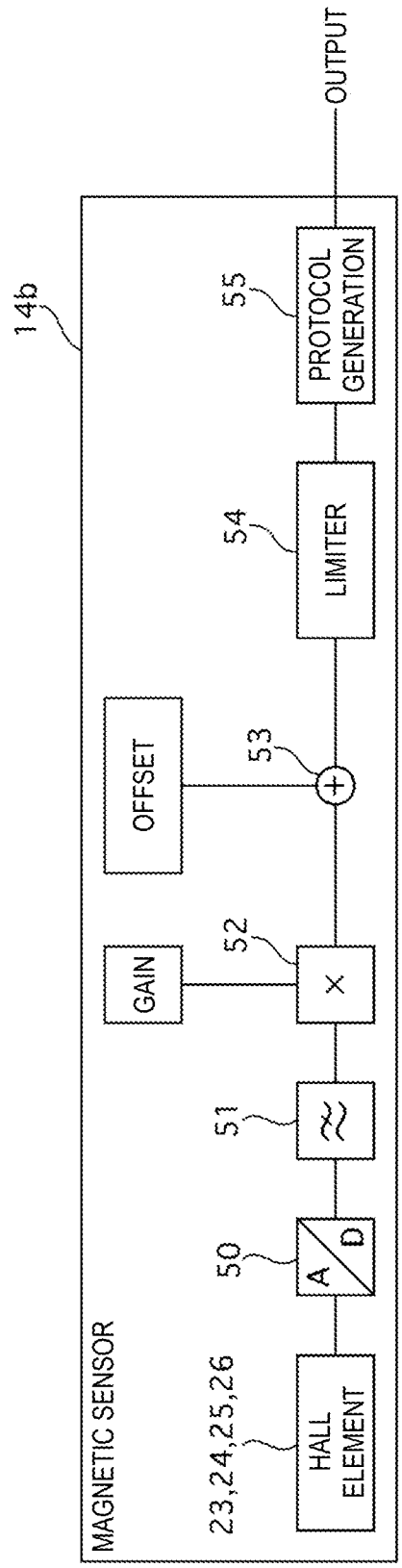
FIG. 10 is a control block diagram of an output adjustment portion according to the first embodiment.

FIG. 10 is a control block diagram of the output adjustment portion 14b.

An A/D conversion portion 50 converts each of the signals output from the first magnetic sensor 23, the second magnetic sensor 24, the third magnetic sensor 25, and the fourth magnetic sensor 26 from an analog signal into a digital signal.

A low-pass filter 51 removes high-frequency noise from the signal output from the A/D conversion portion 50.

A gain adjustment portion 52 multiplies an output of the low-pass filter 51 by a gain. An offset adjustment portion 53 adds an offset value. The gain and the offset value are numerical values adjusted at the time of calibration before the torque sensor 13 is shipped. The gain and the offset value are adjusted in such a manner that approximately equal output signals are output regardless of the error for each product and the error in the mounting position between the first magnetic sensor 23, the second magnetic sensor 24, the third magnetic sensor 25, and the fourth magnetic sensor 26.

A limiter 54 limits an excessive signal.

A protocol generation portion 55 converts the signal into a signal in compliance with a communication method, and outputs the converted signal.

[Torque Detection Method]

In a state without the steering torque input, the central position of each of the first claw portions 211b of the first yoke member 211 and the second claw portions 212b of the second yoke member 212 in the width direction faces the boundary position between the N pole and the S pole of the magnet 20. At this time, permeance is equal with respect to the N pole and the S pole of the magnet 20 from the viewpoint of the claw portions 211b and 212b. A magnetic flux generated from the N pole of the magnet 20 enters the claw portions 211b and 212b and enters the S pole directly therefrom. Therefore, no magnetic flux flows between the first magnetic collection mechanism 221 and the second magnetic collection mechanism 222. At this time, the first magnetic sensor 23, the second magnetic sensor 24, the third magnetic sensor 25, and the fourth magnetic sensor 26 each output an intermediate voltage.

When the steering torque is input, the torsion bar 6 is twisted, and a relative angular displacement is generated between the input shaft 5 and the pinion shaft 7. This relative angular displacement emerges as a relative angular displacement between the claw portions 211b and 212b and the magnet 20. When the relative angular displacement is generated between the claw portions 211b and 212b and the magnet 20, the permeance loses its balance with respect to the N pole and the S pole of the magnet 20 from the viewpoint of the claw portions 211b and 212b. The magnetic flux generated from the N pole of the magnet 20 flows in a direction toward one of the claw portions 211b and 212b that faces the N pole over a wider area. Therefore, a magnetic flux flows between the first magnetic collection mechanism 221 and the second magnetic collection mechanism 222. The first magnetic sensor 23, the second magnetic sensor 24, the third magnetic sensor 25, and the fourth magnetic sensor 26 each detect an amount of the flowing magnetic flux, and output a signal according to the detected amount of the magnetic flux. As a result, the torque sensor 13 can detect a torsion amount of the torsion bar 3, thereby calculating the steering torque from rigidity of the torsion bar 3.

[Detection of Abnormality in Magnetic Sensor]

Now, hypothetically suppose that an abnormality has occurred in the first magnetic sensor 23. The output signal of the first magnetic sensor 23 is different from the output signals of the second magnetic sensor 24, the third magnetic sensor 25, and the fourth magnetic sensor 26. On the other hand, all of the normal second magnetic sensor 24, third magnetic sensor 25, and fourth magnetic sensor 26 output the same signals as the output signals thereof. Therefore, the torque sensor 13 can determine that the abnormality has occurred in the first magnetic sensor 23 outputting the different output signal from the output signals of the other three magnetic sensors.

Since being able to identify that the magnetic sensor having the abnormality therein is the first magnetic sensor 23, the torque sensor 13 can detect the steering torque with use of the output signals of the second magnetic sensor 24, the third magnetic sensor 25, and the fourth magnetic sensor 26.

[Function]

At least two magnetic sensors should be provided to detect that an abnormality has occurred in the magnetic sensor. If the signals of the two magnetic sensors are compared, and the compared signals have different contents from each other, it can be determined that the abnormality has occurred in any of the magnetic sensors.

However, it cannot be determined which magnetic sensor has the abnormality therein even by comparing the signals of the two magnetic sensors. Therefore, this technique has a problem of being unable to continue the control using the torque sensor 13. At least three magnetic sensors are necessary to identify the magnetic sensor in which the abnormality has occurred.

Therefore, in the first embodiment, the four magnetic sensors (the first magnetic sensor 23, the second magnetic sensor 24, the third magnetic sensor 25, and the fourth magnetic sensor 26) are provided. Due to this configuration, the magnetic sensor in which the abnormality has occurred can be identified. The steering torque can be detected with use of the other magnetic sensors in which no abnormality has occurred. Therefore, the electric power steering apparatus 1 can continue the control using the torque sensor 13 even when the abnormality has occurred in any of the magnetic sensors.

Further, the positions at which the first magnetic sensor 23, the second magnetic sensor 24, the third magnetic sensor 25, and the fourth magnetic sensor 26 are disposed are arranged in such a manner that the magnetic environments match one another there. This arrangement allows the respective magnetic flux lines passing through the first magnetic sensor 23, the second magnetic sensor 24, the third magnetic sensor 25, and the fourth magnetic sensor 26 to have approximately the same characteristics, thereby succeeding in preventing or reducing a variation in the output signal characteristic of each of the sensors. Therefore, the torque sensor 13 can improve stability of accuracy of detecting the steering torque.

Further, in the first embodiment, the first magnetic collection mechanism 221 is formed into the circular arc shape along the circumferential direction of the rotational axis of the input shaft 5. The second magnetic collection mechanism 222 is formed into the circular arc shape along the circumferential direction of the rotational axis of the input shaft 5. The second magnetic collection mechanism 222 is provided so as to overlap the first magnetic collection mechanism 221 in the rotational axis direction and the circumferential direction of the input shaft 5. The second magnetic collection mechanism 222 is provided so as to be spaced apart from the first magnetic collection mechanism 221 in the radial direction of the rotational axis of the input shaft 5.

Due to this configuration, the present embodiment allows the first magnetic sensor 23, the second magnetic sensor 24, the third magnetic sensor 25, and the fourth magnetic sensor 26 to be inserted between the first magnetic collection mechanism 221 and the second magnetic collection mechanism 222 along the rotational axis direction of the input shaft 5. Therefore, the present embodiment facilitates assembling of the torque sensor 13. Further, even if the positions of the first magnetic sensor 23, the second magnetic sensor 24, the third magnetic sensor 25, and the fourth magnetic sensor 26 relative to the first magnetic collection mechanism 221 and the second magnetic collection 222 are offset in the rotational axis direction of the input shaft 5, the present embodiment can prevent or reduce a change in the magnetic fluxes detected by the first magnetic sensor 23, the second magnetic sensor 24, the third magnetic sensor 25, and the fourth magnetic sensor 26.

Further, in the first embodiment, the first magnetic sensor 23, the second magnetic sensor 24, the third magnetic sensor 25, and the fourth magnetic sensor 26 are disposed with the output terminals 23a, 24a, 25a, and 26a of the individual sensors extending toward the same direction toward the rotational axis direction of the input shaft 5. Due to this configuration, the present embodiment allows the first magnetic sensor 23, the second magnetic sensor 24, the third magnetic sensor 25, and the fourth magnetic sensor 26 to be inserted into between the first magnetic collection mechanism 221 and the second magnetic collection mechanism 222 from the same direction, thereby facilitating the assembling of the torque sensor 13.

Further, in the first embodiment, the output terminals 23a, 24a, 25a, and 26a of the first magnetic sensor 23, the second magnetic sensor 24, the third magnetic sensor 25, and the fourth magnetic sensor 26 are connected to the same controller 14. As a result, the present embodiment can simplify the configuration of the torque sensor 13, thereby facilitating the assembling.

Further, in the first embodiment, the output signals of the first magnetic sensor 23, the second magnetic sensor 24, the third magnetic sensor 25, and the fourth magnetic sensor 26 are output from the connector portion 32 to the controller 14. As a result, the present embodiment can simplify the configuration of the torque sensor 13.

Further, in the first embodiment, the first magnetic collection mechanism 221 and the second magnetic collection mechanism 222 are fixed by the holder member 28 made from the insulating material. Due to this configuration, the present embodiment can prevent or reduce the positional offset of the first magnetic collection mechanism 221 and the second magnetic collection mechanism 222, thereby succeeding in stably maintaining the magnetic environments at the positions where the first magnetic sensor 23, the second magnetic sensor 24, the third magnetic sensor 25, and the fourth magnetic sensor 26 are disposed.

Further, in the first embodiment, the holder member 28 is formed by the injection molding from the resin material together with the first magnetic collection mechanism 221 and the second magnetic collection mechanism 222. Due to this configuration, the present embodiment eliminates work of separately installing the first magnetic collection mechanism 221 and the second magnetic collection mechanism 222 on the torque sensor 13, thereby succeeding in simplifying the work of assembling the torque sensor 13.

Further, in the first embodiment, the gate portions 281 used when the holder member 28 is formed by the injection molding are provided at the positions symmetric with respect to the first magnetic collection mechanism 221 and the second magnetic collection mechanism 222. An internal stress is applied to the first magnetic collection mechanism 221 and the second magnetic collection mechanism 222 at the time of the injection molding. The application of the internal stress causes a change in the magnetic environments of the first magnetic collection mechanism 221 and the second magnetic collection mechanism 222. Providing the gate portions 281 symmetrically with respect to the first magnetic collection mechanism 221 and the second magnetic collection mechanism 222 causes the internal stress to occur symmetrically with respect to the first magnetic collection mechanism 221 and the second magnetic collection mechanism 222. Therefore, even if a change has occurred in the magnetic environments of the first magnetic collection mechanism 221 and the second magnetic collection mechanism 222 due to the internal stress, this change can be symmetrized with respect to the first magnetic collection mechanism 221 and the second magnetic collection mechanism 222. The magnetic environments can match one another at the positions where the first magnetic sensor 23, the second magnetic sensor 24, the third magnetic sensor 25, and the fourth magnetic sensor 26 are disposed, which can prevent or reduce the variation in the output signal characteristics of the first magnetic sensor 23, the second magnetic sensor 24, the third magnetic sensor 25, and the fourth magnetic sensor 26. Therefore, the torque sensor 13 can improve the stability of the accuracy of detecting the steering torque.

Further, in the first embodiment, the first magnetic sensor 23 and the third magnetic sensor 25 are provided at the positions symmetric with respect to the rotational axis O of the input shaft 5. The second magnetic sensor 24 and the fourth magnetic sensor 26 are provided at the positions symmetric with respect to the rotational axis O of the input shaft 5. The first magnetic collection mechanism 221 and the second magnetic collection mechanism 222 are each formed into the circular arc shape around the rotational axis O of the input shaft 5. Disposing the individual magnetic sensors at the symmetric positions based on the rotational axis O of the same input shaft 5 allows the positions of the individual magnetic sensors to be located at the positions where the magnetic environments approximately match one another.

Further, in the first embodiment, the first magnetic collection mechanism 221 includes the first magnetic collection member 221a and the second magnetic collection member 221b. The first magnetic collection member 221a and the second magnetic collection member 221b have the identical shapes to each other. The second magnetic collection mechanism 222 includes the third magnetic collection member 222a and the fourth magnetic collection member 222b. The third magnetic collection member 222a and the fourth magnetic collection member 222b have the identical shapes to each other. The first magnetic sensor 23 and the second magnetic sensor 24 are disposed between the first magnetic collection member 221a and the third magnetic collection member 222a. The third magnetic sensor 25 and the fourth magnetic sensor 26 are disposed between the second magnetic collection member 221b and the fourth magnetic collection member 222b.

Due to this configuration, two pairs of magnetic collection members, i.e., a pair of the first magnetic collection member 221a and the third magnetic collection member 222a and a pair of the second magnetic collection member 221b and the fourth magnetic collection member 222b can be provided. Since the first magnetic collection member 221a and the second magnetic collection member 221b have the identical shapes to each other and the third magnetic collection member 222a and the fourth magnetic collection member 222b have the identical shapes to each other, the magnetic environments approximately match each other at the two pairs of magnetic collection members. Since the first magnetic sensor 23 and the second magnetic sensor 24 are disposed in one of the pairs of magnetic collection members, and the third magnetic sensor 25 and the fourth magnetic sensor 26 are disposed in the other of the pairs of magnetic collection members, the magnetic environments can approximately match one another at the positions where the first magnetic sensor 23, the second magnetic sensor 24, the third magnetic sensor 25, and the fourth magnetic sensor 26 are disposed.

Further, in the first embodiment, the first magnetic collection member 221a, the second magnetic collection member 221b, the third magnetic collection member 222a, and the fourth magnetic collection member 222b are provided on the same plane orthogonal to the rotational axis of the rotational member 16. Due to this configuration, the present embodiment can achieve a reduction in the dimension of the rotational member 16 of the torque sensor 13 in the rotational axis direction.

Further, in the first embodiment, the angles of the widths of the first magnetic collection member 221a, the second magnetic collection member 221b, the third magnetic collection member 222a, and the fourth magnetic collection member 222b in the circumferential direction of the rotational axis of the rotational member 16 are set so as to fall below 180 degrees. Due to this configuration, the present embodiment allows the two pair of magnetic collection members to be disposed on the same plane.

Further, in the first embodiment, the first magnetic sensor 23 and the second magnetic sensor 24 are connected to the common first power source circuit 45 and first ground circuit 46. The third magnetic sensor 25 and the fourth magnetic sensor 26 are connected to the common second power source circuit 47 and second ground circuit 48. Due to this configuration, the present embodiment can achieve simplification of the circuit.

Further, in the first embodiment, the controller 14 is provided with the abnormality detection portion 14a, which detects the abnormality in the first power source circuit 45, the first ground circuit 46, the second power source circuit 47, and the second ground circuit 48. For example, even when the abnormality has occurred in the first power source circuit 45, the first magnetic sensor 23 and the second magnetic sensor 24 output equal output signals, which makes it impossible to detect the abnormality with the aid of the difference in the output signal. Alternatively, an abnormal value may be determined to be a normal value. Providing the controller 14 with the abnormality detection portion 14a realizes the detection of the abnormality in the first power source circuit 45, the first ground circuit 46, the second power source circuit 47, and the second ground circuit 48, in which the abnormality cannot be detected with use of the output signal of each of the sensors. Further, in the first embodiment, the output adjustment portion 14b, which reduces the difference in the output signal generated due to the error for each product and the error in the mounting position between the first magnetic sensor 23, the second magnetic sensor 24, the third magnetic sensor 25, and the fourth magnetic sensor 26. Due to this configuration, the present embodiment realizes the adjustment allowing the sensors to output approximately equal output signals regardless of the error for each product and the error in the mounting position between the first magnetic sensor 23, the second magnetic sensor 24, the third magnetic sensor 25, and the fourth magnetic sensor 26.

[Advantageous Effect]

(1) The torque sensor 13 includes: the rotational member 16 including the pinion shaft 7 (a first shaft) and the input shaft 5 (a second shaft) connected to each other via the torsion bar 6; the magnet 20 provided to the pinion shaft 7 rotatably according to the rotation of the pinion shaft 7, annularly formed, and arranged in such a manner that the N pole and the S pole are disposed alternately in the circumferential direction; the first yoke member 211 provided to the input shaft 5 rotatably according to the rotation of the input shaft 5, made from the magnetic material, and including the first claw portions 211b (first claw portions), which is the plurality of plate-like members disposed so as to face the magnet 20, and the first annular portion 211a (a first annular portion) formed annularly and connecting the first claw portions 211b to one another; the second yoke member 212 provided to the input shaft 5 rotatably according to the rotation of the input shaft 5, made from the magnetic material, including the second claw portions 212b (second claw portions), which is the plurality of plate-like members disposed so as to face the magnet 20, and the second annular portion 212a (a second annular portion) formed annularly and connecting the second claw portions 212b to one another, and disposed in such a manner that each of the second claw portions 212b is disposed so as to be arranged alternately between the respective claw portions of the first claw portions 211b; the first magnetic collection mechanism 221 (a first magnetic collection mechanism) provided so as to face the first annular portion 211a and be spaced apart from the first annular portion 211a and made from the magnetic material; the second magnetic collection mechanism 222 (a second magnetic collection mechanism) provided so as to face the second annular portion 212a and be spaced apart from the second annular portion 212a and made from the magnetic material; the first magnetic sensor 23 (a first magnetic sensor) provided between the first magnetic collection mechanism 221 and the second magnetic collection mechanism 222 and including the Hall element configured to detect the change in the magnetic field between the first magnetic collection mechanism 221 and the second magnetic collection mechanism 222; the second magnetic sensor 24 (a second magnetic sensor) provided between the first magnetic collection mechanism 221 and the second magnetic collection mechanism 222, including the Hall element configured to detect the change in the magnetic field between the first magnetic collection mechanism 221 and the second magnetic collection mechanism 222, and disposed at the same position as or the symmetric position to the magnetic environment of the first magnetic sensor 23 between the first magnetic collection mechanism 221 and the second magnetic collection mechanism 222; and the third magnetic sensor 25 (a third magnetic sensor) provided between the first magnetic collection mechanism 221 and the second magnetic collection mechanism 222, including the Hall element configured to detect the change in the magnetic field between the first magnetic collection mechanism 221 and the second magnetic collection mechanism 222, and disposed at the same position as or the symmetric position to the magnetic environment of the first magnetic sensor 23 and the magnetic environment of the second magnetic sensor 24 between the first magnetic collection mechanism 221 and the second magnetic collection mechanism 222. The torque sensor 13 detects the torque generated on the rotational member 16 based on the output signal of the first magnetic sensor 23, the second magnetic sensor 24, or the third magnetic sensor 25.

Therefore, the present embodiment allows the electric power steering apparatus 1 to continue the control using the torque sensor 13 even when the abnormality has occurred in any of the magnetic sensors. Further, the present embodiment can improve the stability of the accuracy of detecting the steering torque.

(2) The first magnetic collection mechanism 221 is formed into the circular arc shape along the circumferential direction of the rotational axis of the rotational member 16. The second magnetic collection mechanism 222 is formed into the circular arc shape along the circumferential direction of the rotational axis of the rotational member 16, and is provided so as to overlap the first magnetic collection mechanism 221 in the direction of the rotational axis and the circumferential direction of the rotational member 16 and be spaced apart from the first magnetic collection mechanism 221 in the radial direction of the rotational axis of the rotational member 16. The first magnetic sensor 23, the second magnetic sensor 24, and the third magnetic sensor 25 are disposed between the first magnetic collection mechanism 221 and the second magnetic collection mechanism 222 in the radial direction of the rotational axis of the rotational member 16.

Therefore, the present embodiment facilitates the assembling of the torque sensor 13. Further, even if the positions of the first magnetic sensor 23, the second magnetic sensor 24, and the third magnetic sensor 25 relative to the first magnetic collection mechanism 221 and the second magnetic collection 222 are offset in the rotational axis direction of the input shaft 5, the present embodiment can prevent or reduce the change in the magnetic fluxes detected by the first magnetic sensor 23, the second magnetic sensor 24, and the third magnetic sensor 25.

(3) The first magnetic sensor 23, the second magnetic sensor 24, and the third magnetic sensor 25 include the output terminals 23a, 24a, and 25a for outputting the output signals, respectively. The output terminals 23a, 24a, and 25a of the first magnetic sensor 23, the second magnetic sensor 24, and the third magnetic sensor 25 are provided so as to extend in the same direction in the direction of the rotational axis of the rotational member 16.

Therefore, the present embodiment facilitates the assembling of the torque sensor 13.

(4) The torque sensor 13 further includes the single circuit substrate 30 to which the output terminals 23a, 24a, and 25a of the first magnetic sensor 23, the second magnetic sensor 24, and the third magnetic sensor 25 are connected.

Therefore, the present embodiment can simplify the configuration of the torque sensor 13, thereby facilitating the assembling thereof.

(5) The torque sensor 13 further includes the connector portion 32 for connecting the harness 31 configured to electrically connect the circuit substrate 30 and the external controller 14 to each other. The connector portion 32 outputs the output signals from the first magnetic sensor 23, the second magnetic sensor 24, and the third magnetic sensor 25 to the controller 14.

Therefore, the present embodiment can simplify the configuration of the torque sensor 13.

(6) The torque sensor 13 further includes the holder member 28 (a holding member) made from the insulating material and configured in such a manner that the first magnetic collection mechanism 221 and the second magnetic collection mechanism 222 are fixed thereto.

Therefore, the present embodiment can stably maintain the magnetic environments at the positions where the first magnetic sensor 23, the second magnetic sensor 24, and the third magnetic sensor 25 are disposed.

(7) The torque sensor 13 further includes the holder member 28 (a holding member) made from the resin material and formed by the injection molding. The holder member 28 fixes the first magnetic collection mechanism 221 and the second magnetic collection mechanism 222 by the insert molding.

Therefore, the present embodiment can simplify the work of assembling the torque sensor 13.

(8) The gate portions 281 for the injection molding of the holder member 28 are provided at the positions symmetric with respect to each of the first magnetic collection mechanism 221 and the second magnetic collection mechanism 222.

Therefore, the present embodiment can improve the stability of the accuracy of detecting the steering torque.

(9) The first magnetic collection mechanism 221 is formed into the circular arc shape along the circumferential direction of the rotational axis of the rotational member 16. The second magnetic collection mechanism 222 is formed into the circular arc shape along the circumferential direction of the rotational axis of the rotational member 16, and is provided so as to overlap the first magnetic collection mechanism 221 in the direction of the rotational axis and the circumferential direction of the rotational member 16 and be spaced apart from the first magnetic collection mechanism 221 in the radial direction of the rotational axis of the rotational member 16. The first magnetic sensor 23, the second magnetic sensor 24, and the third magnetic sensor 25 are provided at the positions symmetric to one another with respect to the rotational axis of the rotational member 16.

Therefore, the present embodiment allows the magnetic environments to approximately match one another at the positions where the first magnetic sensor 23, the second magnetic sensor 24, and the third magnetic sensor 25 are disposed.

(10) The first magnetic collection mechanism 221 includes the first magnetic collection member 221a (a first magnetic collection member), and the second magnetic collection member 221b (a second magnetic collection member) having the identical shape to the first magnetic collection member 221a. The second magnetic collection mechanism 222 includes the third magnetic collection member 222a (a third magnetic collection member) provided so as to face the first magnetic collection member 221a and be spaced apart from the first magnetic collection member 221a, and the fourth magnetic collection member 222b (a fourth magnetic collection member) provided so as to face the second magnetic collection member 221b and be spaced apart from the second magnetic collection member 221b. The fourth magnetic collection member 222b has the identical shape to the third magnetic collection member 222a. One of the first magnetic sensor 23, the second magnetic sensor 24, and the third magnetic sensor 25 is disposed between the first magnetic collection member 221*a* and the third magnetic collection member 222*a*, and at least one of the remaining two magnetic sensors is disposed between the second magnetic collection member 221*b* and the fourth magnetic collection member 222*b*.

Therefore, the present embodiment allows the magnetic environments to approximately match one another at the positions where the first magnetic sensor 23, the second magnetic sensor 24, and the third magnetic sensor 25 are disposed.

(11) The first magnetic collection member 221*a*, the second magnetic collection member 221*b*, the third magnetic collection member 222*a*, and the fourth magnetic collection member 222*b* are provided on the same plane orthogonal to the rotational axis of the rotational member 16.

Therefore, the present embodiment can achieve the reduction in the dimension of the rotational member 16 of the torque sensor 13 in the rotational axis direction.

(12) The angles of the respective widths of the first magnetic collection member 221*a*, the second magnetic collection member 221*b*, the third magnetic collection member 222*a*, and the fourth magnetic collection member 222*b* in the circumferential direction of the rotational axis of the rotational member 16 are smaller than 180 degrees.

Therefore, the present embodiment can improve layout flexibility when the plurality of pairs (the two pairs) of magnetic collection members are laid out

(13) The first magnetic collection mechanism 221 and the second magnetic collection mechanism 222 are formed symmetrically with respect to the rotational axis of the rotational member 16. The first magnetic sensor 23, the second magnetic sensor 24, and the third magnetic sensor 25 are disposed at the positions symmetric to one another with respect to the rotational axis of the rotational member 16.

Therefore, the present embodiment allows the magnetic environments to approximately match one another at the positions where the first magnetic sensor 23, the second magnetic sensor 24, and the third magnetic sensor 25 are disposed.

(14) The torque sensor 13 further includes the power source circuits 45 and 47, the ground circuits 46 and 48, and the controller 14 (a microprocessor) connected to the first magnetic sensor 23, the second magnetic sensor 24, and the third magnetic sensor 25. At least two of the first magnetic sensor 23, the second magnetic sensor 24, and the third magnetic sensor 25 are connected to the common first power source circuit 45 and the common ground circuit 46. The controller 14 includes the abnormality detection portion 14*a* configured to detect the abnormality in the power source circuits 45 and 47 and the ground circuits 46 and 48.

Therefore, the present embodiment can simplify the circuit. Further, the present embodiment can realize the detection of the abnormality in the power source circuits 45 and 47 and the ground circuits 46 and 48, in which the abnormality cannot be detected with use of the output signal of each of the sensors.

(15) The torque sensor 13 further includes the output adjustment portion 14*b* configured to reduce the difference between the output signals of the first magnetic sensor 23, the second magnetic sensor 24, and the third magnetic sensor 25 by multiplying the output signals of the first magnetic sensor 23, the second magnetic sensor 24, and the third magnetic sensor 25 by the gain.

The present embodiment can reduce the error in the output signals of the first magnetic sensor 23, the second magnetic sensor 24, and the third magnetic sensor 25, thereby improving the accuracy with which the torque sensor 13 detects the steering torque.

(16) The electric power steering apparatus 1 includes the steering mechanism 17 including the input shaft 5 (a steering shaft) including the pinion shaft 7 (a first shaft) and the input shaft 5 (a second shaft) connected to each other via the torsion bar 6 and configured to rotate according to the steering operation on the steering wheel 2 and the rack bar 9 configured to transmit the rotation of the input shaft 5 to the turning target wheel 4; the torque sensor 13 configured to detect the steering torque generated at the steering mechanism 17; the electric motor 3 configured to be controlled to be driven based on the steering torque and provide the steering force to the steering mechanism 17; and the controller 14 (a control device) configured to control and drive the electric motor 3. The torque sensor 13 includes the magnet 20 provided to the pinion shaft 7 rotatably according to the rotation of the pinion shaft 7, annularly formed, and arranged in such a manner that the N pole and the S pole are disposed alternately in the circumferential direction; the first yoke member 211 provided to the input shaft 5 rotatably according to the rotation of the input shaft 5, made from the magnetic material, and including the first claw portions 211*b* (first claw portions), which is the plurality of plate-like members disposed so as to face the magnet 20, and the first annular portion 211*a* (a first annular portion) formed annularly and connecting the first claw portions 211*b* to one another; the second yoke member 212 provided to the input shaft 5 rotatably according to the rotation of the input shaft 5, made from the magnetic material, including the second claw portions 212*b* (second claw portions), which is the plurality of plate-like members disposed so as to face the magnet 20, and the second annular portion 212*a* (a second annular portion) formed annularly and connecting the second claw portions 212*b* to one another, and disposed in such a manner that each of the second claw portions 212*b* is disposed so as to be arranged alternately between the respective claw portions of the first claw portions 211*b*; the first magnetic collection mechanism 221 (a first magnetic collection mechanism) provided so as to face the first annular portion 211*a* and be spaced apart from the first annular portion 211*a* and made from the magnetic material; the second magnetic collection mechanism 222 (a second magnetic collection mechanism) provided so as to face the second annular portion 212*a* and be spaced apart from the second annular portion 212*a* and made from the magnetic material; the first magnetic sensor 23 (a first magnetic sensor) provided between the first magnetic collection mechanism 221 and the second magnetic collection mechanism 222 and including the Hall element configured to detect the change in the magnetic field between the first magnetic collection mechanism 221 and the second magnetic collection mechanism 222; the second magnetic sensor 24 (a second magnetic sensor) provided between the first magnetic collection mechanism 221 and the second magnetic collection mechanism 222, including the Hall element configured to detect the change in the magnetic field between the first magnetic collection mechanism 221 and the second magnetic collection mechanism 222, and disposed at the same position as or the symmetric position to the magnetic environment of the first magnetic sensor 23 between the first magnetic collection mechanism 221 and the second magnetic collection mechanism 222; and the third magnetic sensor 25 provided between the first magnetic collection mechanism 221 and the second magnetic collection mechanism 222, including the Hall element configured to detect the change in the magnetic field between the first magnetic collection mechanism 221 and the second magnetic collection mechanism 222, and disposed at the same position as or the symmetric position to the magnetic environment of the first magnetic sensor 23 and the magnetic environment of the second magnetic sensor 24 between the first magnetic collection mechanism 221 and the second magnetic collection mechanism 222.

Therefore, the present embodiment allows the electric power steering apparatus 1 to continue the control using the torque sensor 13 even when the abnormality has occurred in any of the magnetic sensors. Further, the present embodiment can improve the stability of the accuracy of detecting the steering torque.

(17) The first magnetic collection mechanism 221 is formed into the circular arc shape along the circumferential direction of the rotational axis of the rotational member 16. The second magnetic collection mechanism 222 is formed into the circular arc shape along the circumferential direction of the rotational axis of the rotational member 16, and is provided so as to overlap the first magnetic collection mechanism 221 in the direction of the rotational axis and the circumferential direction of the rotational member 16 and be spaced apart from the first magnetic collection mechanism 221 in the radial direction of the rotational axis of the rotational member 16. The first magnetic sensor 23, the second magnetic sensor 24, and the third magnetic sensor 25 are disposed between the first magnetic collection mechanism 221 and the second magnetic collection mechanism 222 in the radial direction of the rotational axis of the rotational member 16.

Therefore, the present embodiment facilitates the assembling of the torque sensor 13. Further, even if the positions of the first magnetic sensor 23, the second magnetic sensor 24, and the third magnetic sensor 25 relative to the first magnetic collection mechanism 221 and the second magnetic collection 222 are offset in the rotational axis direction of the input shaft 5, the present embodiment can prevent or reduce the change in the magnetic fluxes detected by the first magnetic sensor 23, the second magnetic sensor 24, and the third magnetic sensor 25.

Second Embodiment

In the first embodiment, the first magnetic sensor 23 and the second magnetic sensor 24 are provided between the first magnetic collection member 221a and the third magnetic collection member 222a, and the third magnetic sensor 25 and the fourth magnetic sensor 26 are provided between the second magnetic collection member 221b and the fourth magnetic collection member 222b.

On the other hand, a second embodiment is different therefrom in terms of removal of the third magnetic collection member 222a and the fourth magnetic collection member 222b, and provision of the first magnetic sensor 23, the second magnetic sensor 24, the third magnetic sensor 25, and the fourth magnetic sensor 26 between the first magnetic collection member 221a and the third magnetic collection member 222a.

In the following description, an electric power steering apparatus 1 according to the second embodiment will be described, using the same reference numeral for a similar configuration to the electric power steering apparatus 1 according to the first embodiment and omitting a description thereof.

Figure 11:
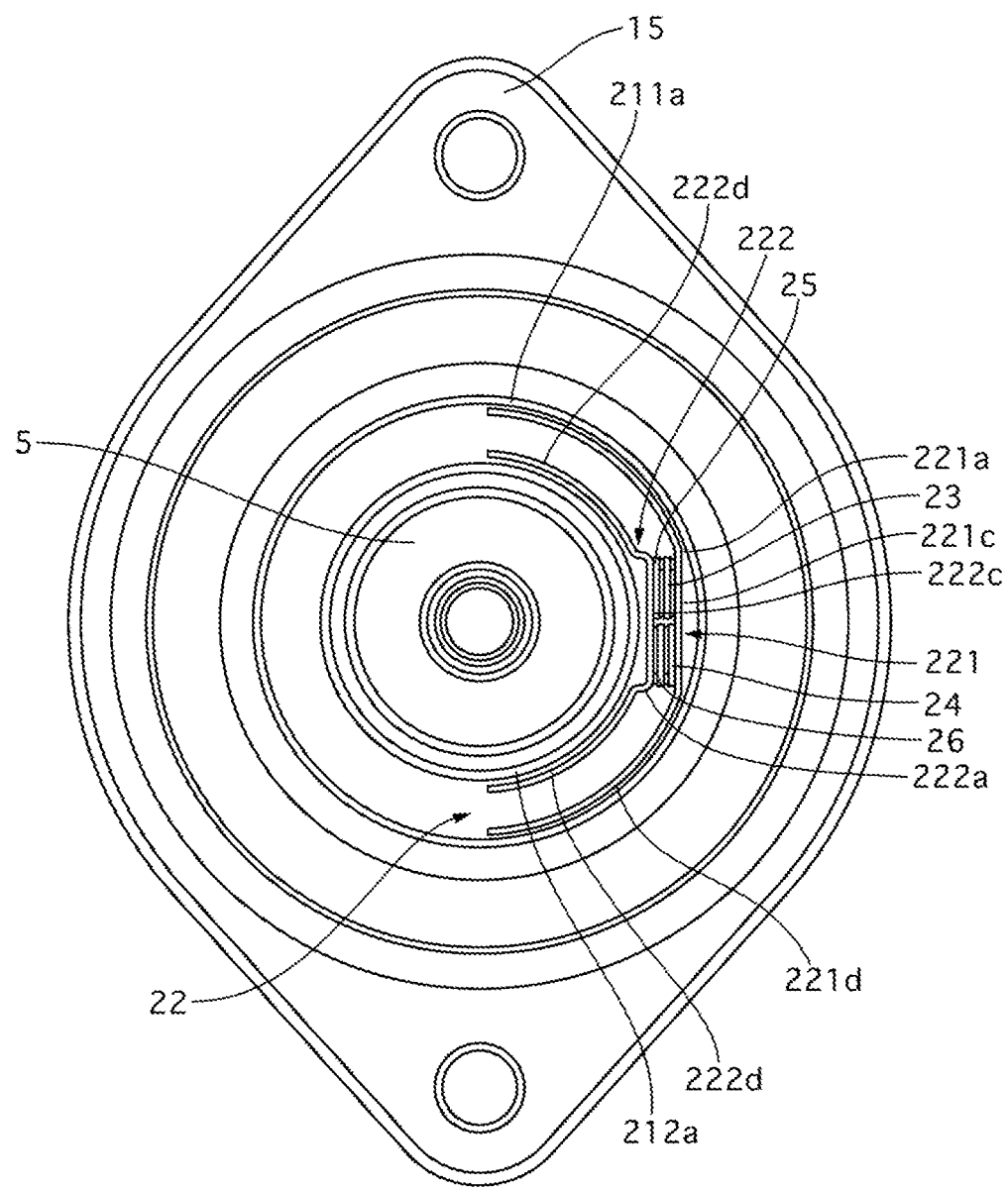
FIG. 11 is a radial cross-sectional view of a torque sensor according to a second embodiment.

FIG. 11 is a cross-sectional view around the first magnetic sensor 23, the second magnetic sensor 24, the third magnetic sensor 25, and the fourth magnetic sensor 26 of the torque sensor 13. The first magnetic collection member 221a and the third magnetic collection member 222a have identical shapes to the first magnetic collection member 221a and the third magnetic collection member 222a according to the first embodiment.

The first magnetic sensor 23, the second magnetic sensor 24, the third magnetic sensor 25, and the fourth magnetic sensor 26 are provided between the magnetic collection portion 221c of the first magnetic collection member 221a (the first magnetic collection mechanism 221) and the magnetic collection portion 222c of the third magnetic collection member 222a (the second magnetic collection mechanism 222).

The first magnetic sensor 23 and the third magnetic sensor 25 are disposed on the same straight line in a direction of a magnetic field generated between the first magnetic collection mechanism 221 and the second magnetic collection mechanism 222. The second magnetic sensor 24 and the fourth magnetic sensor 26 are disposed on the same straight line in the direction of the magnetic field generated between the first magnetic collection mechanism 221 and the second magnetic collection mechanism 222.

[Function]

In the second embodiment, the first magnetic sensor 23 and the third magnetic sensor 25 are disposed on the same straight line in the direction of the magnetic field. The second magnetic sensor 24 and the fourth magnetic sensor 26 are disposed on the same straight line in the direction of the magnetic field. The magnetic environments match one another on the same straight line in the direction of the magnetic field. As a result, the magnetic environments can match each other at each of the positions at which the first magnetic sensor 23 and the third magnetic sensor 25 are disposed, and the positions at which the second magnetic sensor 24 and the fourth magnetic sensor 26 are disposed.

[Advantageous Effect]

(18) At least two of the first magnetic sensor 23, the second magnetic sensor 24, and the third magnetic sensor 25 are disposed on the same straight line in the direction of the magnetic field generated between the first magnetic collection mechanism 221 and the second magnetic collection mechanism 222.

Therefore, the present embodiment allows the magnetic environments to approximately match one another at the positions where the first magnetic sensor 23, the second magnetic sensor 24, and the third magnetic sensor 25 are disposed.

Third Embodiment

In the first embodiment, the first magnetic sensor 23 and the second magnetic sensor 24 are provided between the first magnetic collection member 221a and the third magnetic collection member 222a, and the third magnetic sensor 25 and the fourth magnetic sensor 26 are provided between the second magnetic collection member 221b and the fourth magnetic collection member 222b.

On the other hand, a third embodiment is different therefrom in terms of removal of the third magnetic collection member 222a and the fourth magnetic collection member 222b, and provision of the first magnetic sensor 23 and the third magnetic sensor 25 on one chip and the second magnetic sensor 24 and the fourth magnetic sensor 26 on another single chip.

In the following description, an electric power steering apparatus 1 according to the third embodiment will be described, using the same reference numeral for a similar configuration to the electric power steering apparatus 1 according to the first embodiment and omitting a description thereof.

Figure 12:
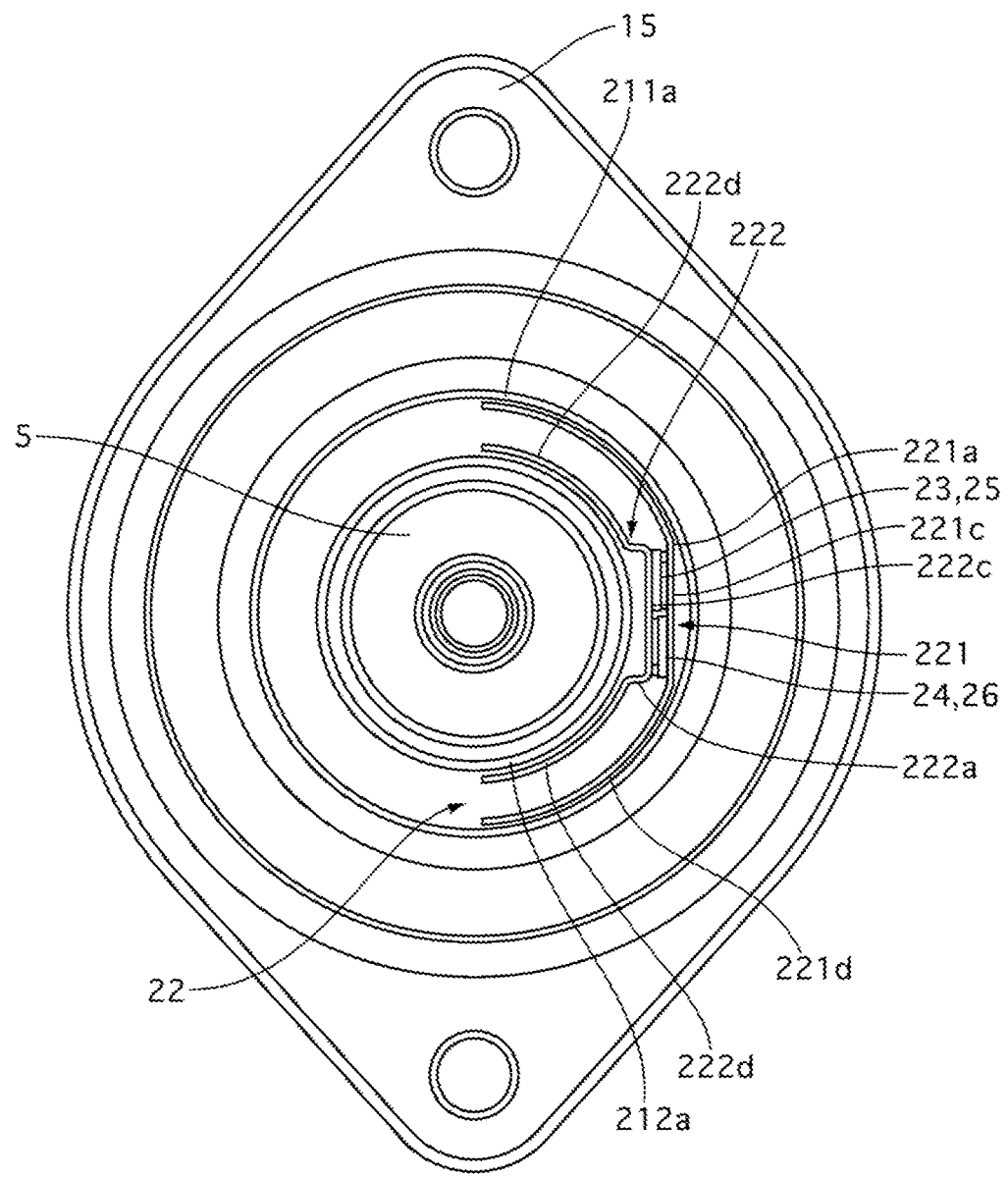
FIG. 12 is a radial cross-sectional view of a torque sensor according to a third embodiment.

FIG. 12 is a cross-sectional view around the first magnetic sensor 23, the second magnetic sensor 24, the third magnetic sensor 25, and the fourth magnetic sensor 26 of the torque sensor 13. The first magnetic collection member 221a and the third magnetic collection member 222a have identical shapes to the first magnetic collection member 221a and the third magnetic collection member 222a according to the first embodiment.

The first magnetic sensor 23, the second magnetic sensor 24, the third magnetic sensor 25, and the fourth magnetic sensor 26 are provided between the magnetic collection portion 221c of the first magnetic collection member 221a (the first magnetic collection mechanism 221) and the magnetic collection portion 222c of the third magnetic collection member 222a (the second magnetic collection mechanism 222).

The first magnetic sensor 23 and the third magnetic sensor 25 are mounted on the same chip. The second magnetic sensor 24 and the fourth magnetic sensor 26 are mounted on the same chip.

[Function]

In the third embodiment, the first magnetic sensor 23 and the third magnetic sensor 25 are mounted on the same chip, and the second magnetic sensor 24 and the fourth magnetic sensor 26 are mounted on the same chip. The magnetic sensors mounted on the same chip are provided at positions extremely close to each other. Due to this configuration, the present embodiment allows the magnetic environments to match each other at the individual magnetic sensors.

[Advantageous Effect]

(19) At least two of the first magnetic sensor 23, the second magnetic sensor 24, and the third magnetic sensor 25 are provided in the same chip.

Therefore, the present embodiment allows the magnetic environments to approximately match one another at the positions where the first magnetic sensor 23, the second magnetic sensor 24, and the third magnetic sensor 25 are disposed.

Fourth Embodiment

In the first embodiment, the first magnetic sensor 23, the second magnetic sensor 24, the third magnetic sensor 25, and the fourth magnetic sensor 26 are disposed with the output terminals 23a, 24a, 25a, and 26a extending in the same direction in the rotational axis direction of the input shaft 5.

On the other hand, a fourth embodiment is different therefrom in terms of provision of the first magnetic sensor 23, the second magnetic sensor 24, the third magnetic sensor 25, and the fourth magnetic sensor 26 with the output terminals 23a, 24a, 25a, and 26a extending in the same direction in the radial direction of the rotational axis of the input shaft 5.

In the following description, an electric power steering apparatus 1 according to the fourth embodiment will be described, using the same reference numeral for a similar configuration to the electric power steering apparatus 1 according to the first embodiment and omitting a description thereof.

Figure 13:
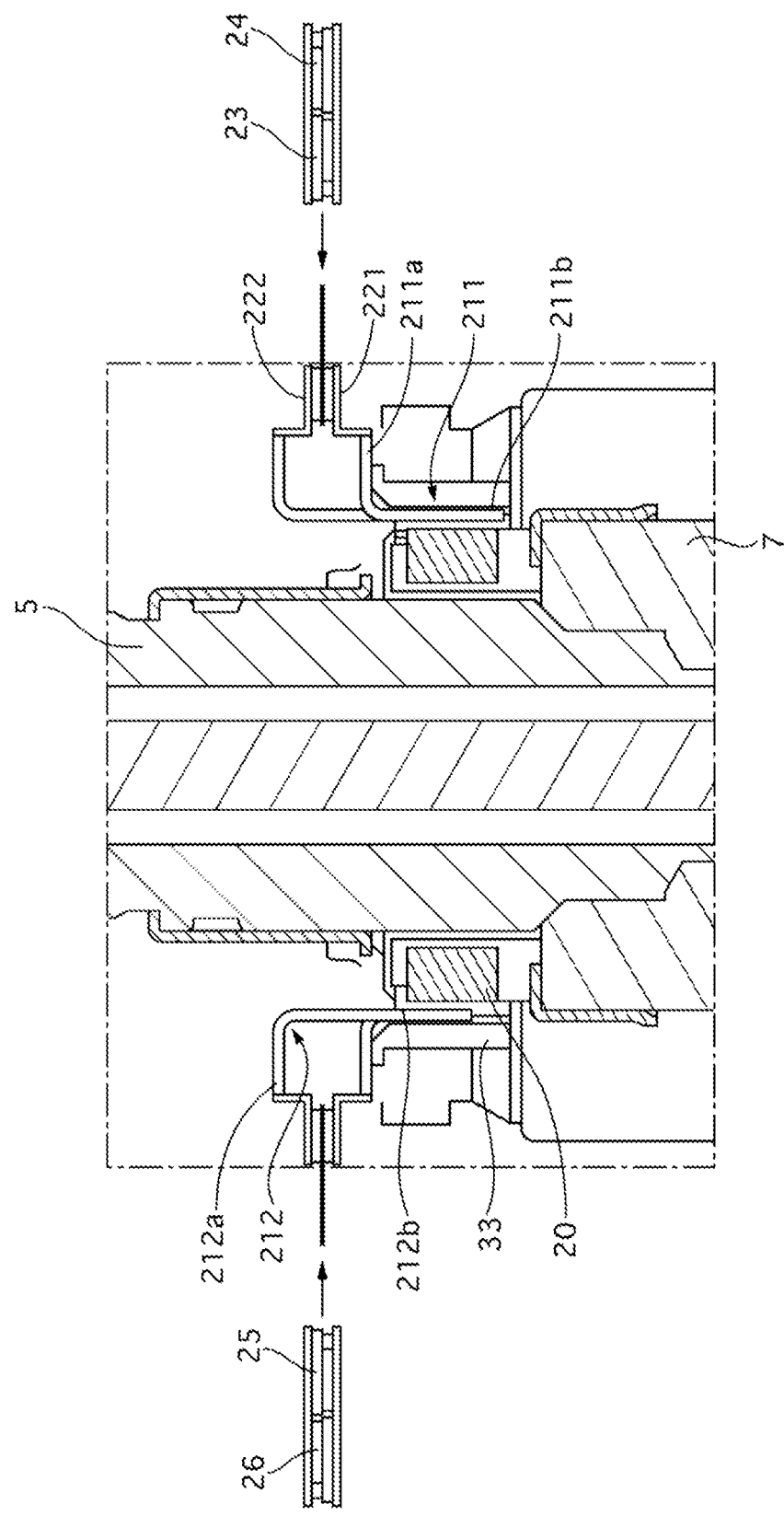
FIG. 13 is an axial cross-sectional view of a torque sensor according to a fourth embodiment.

FIG. 13 is a cross-sectional view around the torque sensor 13. The first annular portion 211a of the first yoke member 211 is bent toward a radially outer side. The second annular portion 212a of the second yoke member 212 is bent toward the radially outer side. The first magnetic collection mechanism 221 is provided so as to extend toward the radially outer side at an end of the first annular portion 211a. The second magnetic collection mechanism 222 is provided so as to extend toward the radially outer side at an end of the second annular portion 212a.

The first magnetic sensor 23 and the second magnetic sensor 24 are inserted in a state adjacent to each other between the first magnetic collection mechanism 221 and the second magnetic collection mechanism 222. The first magnetic sensor 23 and the second magnetic sensor 24 are inserted from the radial direction of the rotational axis of the input shaft 5. The third magnetic sensor 25 and the fourth magnetic sensor 26 are inserted in a state adjacent to each other between the first magnetic collection mechanism 221 and the second magnetic collection mechanism 222. The third magnetic sensor 25 and the fourth magnetic sensor 26 are inserted from the radial direction of the rotational axis of the input shaft 5.

The positions at which the first magnetic sensor 23 and the second magnetic sensor 24 are provided, and the positions at which the third magnetic sensor 25 and the fourth magnetic sensor 26 are provided are set to positions symmetric with respect to the rotational axis of the input shaft 5.

[Function]

In the fourth embodiment, the first magnetic sensor 23, the second magnetic sensor 24, the third magnetic sensor 25, and the fourth magnetic sensor 26 are disposed with the output terminals 23a, 24a, 25a, and 26a of the individual sensors extending toward the same direction toward the radial direction of the rotational axis of the input shaft 5. Due to this configuration, the present embodiment allows the first magnetic sensor 23, the second magnetic sensor 24, the third magnetic sensor 25, and the fourth magnetic sensor 26 to be inserted into between the first magnetic collection mechanism 221 and the second magnetic collection mechanism 222 from the same direction, thereby facilitating the assembling of the torque sensor 13.

[Advantageous Effect]

(20) The first magnetic sensor 23, the second magnetic sensor 24, and the third magnetic sensor 25 include the output terminals 23a, 24a, and 25a for outputting the output signals, respectively. The output terminals 23a, 24a, and 25a of the first magnetic sensor 23, the second magnetic sensor 24, and the third magnetic sensor 25 are provided so as to extend toward the same direction in the radial direction of the rotational axis of the rotational member 16.

Therefore, the present embodiment facilitates the assembling of the torque sensor 13.

Fifth Embodiment

In the first embodiment, the first magnetic collection mechanism 221 includes the first magnetic collection member 221a and the second magnetic collection member 221b, and the second magnetic collection mechanism 222 includes the third magnetic collection member 222a and the fourth magnetic collection member 222b.

On the other hand, a fifth embodiment is different therefrom in terms of the first magnetic collection mechanism 221 including the first magnetic collection member 221a, the second magnetic collection member 221b, and a fifth magnetic collection member 221e, and the second magnetic collection mechanism 222 including the third magnetic collection member 222a, the fourth magnetic collection member 222b, and a sixth magnetic collection member 222e.

In the following description, an electric power steering apparatus 1 according to the fifth embodiment will be described, using the same reference numeral for a similar configuration to the electric power steering apparatus 1 according to the first embodiment and omitting a description thereof.

Figure 14:
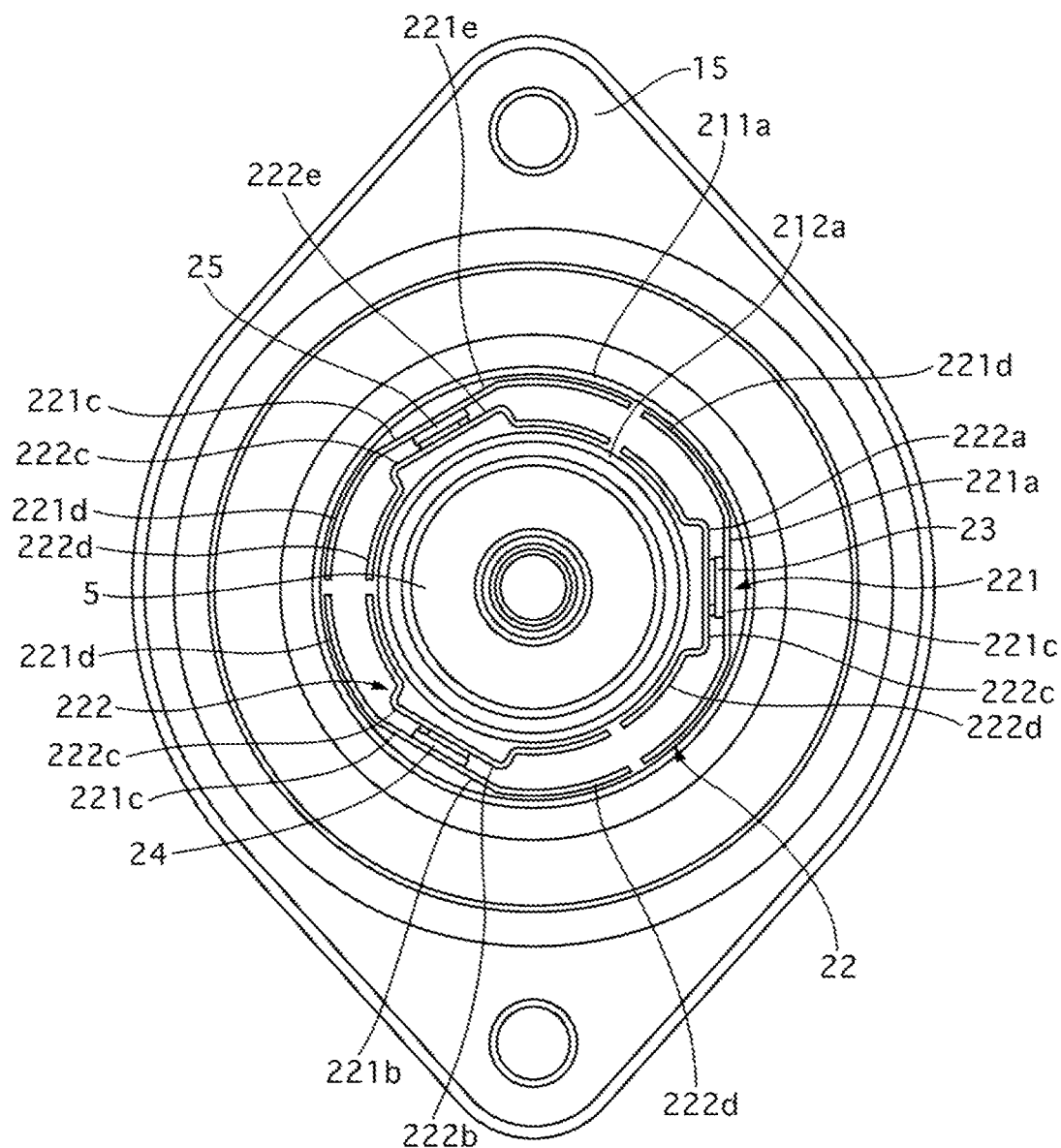
FIG. 14 is a radial cross-sectional view of a torque sensor according to a fifth embodiment.

FIG. 14 is a cross-sectional view around the first magnetic sensor 23, the second magnetic sensor 24, and the third magnetic sensor 25 of the torque sensor 13. The first magnetic collection member 221a, the second magnetic collection member 221b, and the fifth magnetic collection member 221e have identical shapes to the first magnetic collection member 221a and the second magnetic collection member 221b according to the first embodiment, except that they are formed in such a manner that the widths thereof in the circumferential direction of the rotational axis of the input shaft 5 slightly falls below 120 degrees. The third magnetic collection member 222a, the fourth magnetic collection member 222b, and the sixth magnetic collection member 222e have identical shapes to the third magnetic collection member 222a and the fourth magnetic collection member 222b according to the first embodiment, except that they are formed in such a manner that the widths thereof in the circumferential direction of the rotational axis of the input shaft 5 slightly falls below 120 degrees.

The first magnetic sensor 23 is provided between the magnetic collection portion 221c of the first magnetic collection member 221a and the magnetic collection portion 222c of the third magnetic collection member 222a. The second magnetic sensor 24 is provided between the magnetic collection portion 221c of the second magnetic collection member 221b and the magnetic collection portion 222c of the fourth magnetic collection member 222b. The third magnetic sensor 25 is provided between the magnetic collection portion 221c of the fifth magnetic collection member 221e and the magnetic collection portion 222c of the sixth magnetic collection member 222e.

The first magnetic sensor 23, the second magnetic sensor 24, and the third magnetic sensor 25 are disposed at even intervals in the circumferential direction of the rotational axis of the input shaft 5.

[Function]

In the fifth embodiment, the first magnetic sensor 23, the second magnetic sensor 24, and the third magnetic sensor 25 are disposed at the even intervals in the circumferential direction of the rotational axis of the input shaft 5. Due to this configuration, the present embodiment allows the magnetic environments to approximately match one another at the positions where the first magnetic sensor 23, the second magnetic sensor 24, and the third magnetic sensor 25 are disposed.

[Advantageous Effect]

(21) The first magnetic sensor 23, the second magnetic sensor 24, and the third magnetic sensor 25 are disposed at the even intervals in the circumferential direction of the rotational axis of the rotational member 16.

Therefore, the present embodiment allows the magnetic environments to approximately match one another at the positions where the first magnetic sensor 23, the second magnetic sensor 24, and the third magnetic sensor 25 are disposed.

Other Embodiments

Having described the present invention based on the first to fifth embodiments thereof, the specific configuration of each invention is not limited to the first to fifth embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

In the first to fourth embodiments, the four magnetic sensors are used, but the present invention can be realized by using at least three magnetic sensors and the number of magnetic sensors is not especially limited.

Figure 15:
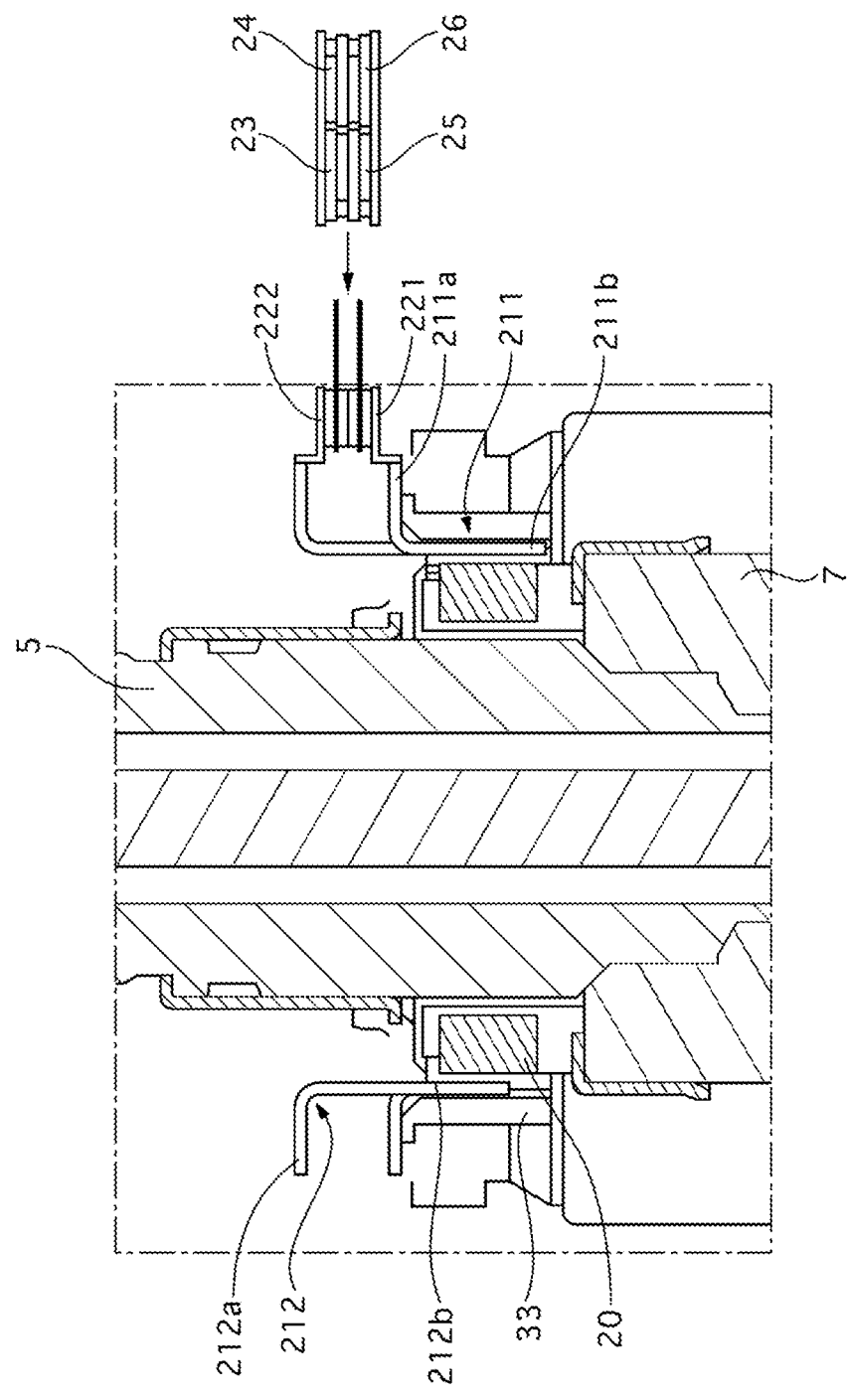
FIG. 15 is an axial cross-sectional view of a torque sensor according to another embodiment.

In the fourth embodiment, the first magnetic sensor 23 and the second magnetic sensor 24 are inserted in the state adjacent to each other, and the third magnetic sensor 25 and the fourth magnetic sensor 26 are inserted in the state adjacent to each other at the different position. This configuration may be modified in such a manner that the first magnetic sensor 23 and the third magnetic sensor 25 overlap each other and the second magnetic sensor 24 and the fourth magnetic sensor 26 similarly overlap each other, in the rotational axis direction of the input shaft 5, and the overlapping two pairs of magnetic sensors are disposed so as to be located adjacent to each other, as illustrated in FIG. 15.

The present application claims priority to Japanese Patent Application No. 2015-112271 filed on Jun. 2, 2015. The entire disclosure of Japanese Patent Application No. 2015- filed on Jun. 2, 2015 including the specification, the claims, the drawings, and the abstract is incorporated herein by reference in its entirety.

REFERENCE SIGN LIST 1 electric power steering apparatus
3 electric motor
5 input shaft (second shaft)
6 torsion bar
7 pinion shaft (first shaft)
14 controller (microprocessor)
14a abnormality detection portion
14b output adjustment portion
16 rotational member
20 magnet
23 first magnetic sensor (first magnetic sensor)
23a output terminal
24 second magnetic sensor (second magnetic sensor)
24a output terminal
25 third magnetic sensor (third magnetic sensor)
25a output terminal
28 holder member (holding member)
30 circuit substrate
45 first power source circuit
46 first ground circuit
47 second power source circuit
48 second ground circuit
211 first yoke member
211a first annular portion (first annular portion)
211b first claw portion (first claw portion)
212 second yoke member
212a second annular portion (second annular portion)
212b second claw portion (second claw portion)
221 first magnetic collection mechanism (first magnetic collection mechanism)
221a first magnetic collection member (first magnetic collection member)

221b second magnetic collection member (second magnetic collection member)
222 second magnetic collection mechanism (second magnetic collection mechanism)
222a third magnetic collection member (third magnetic collection member)
222b fourth magnetic collection member (fourth magnetic collection member)
281 gate portion

The invention claimed is:

1. A torque sensor comprising:
a rotational member including a first shaft and a second shaft connected to each other via a torsion bar;
a magnet provided to the first shaft rotatably according to a rotation of the first shaft, the magnet being annularly formed, the magnet being arranged in such a manner that an N pole and an S pole are disposed alternately in a circumferential direction;
a first yoke member provided to the second shaft rotatably according to a rotation of the second shaft, the first yoke member being made from a magnetic material, the first yoke member including a plurality of first claw portions, which is a plurality of plate-like members disposed so as to face the magnet, and a first annular portion formed annularly and connecting the plurality of first claw portions to one another;
a second yoke member provided to the second shaft rotatably according to the rotation of the second shaft, the second yoke member being made from a magnetic material, the second yoke member including a plurality of second claw portions, which is a plurality of plate-like members disposed so as to face the magnet, and a second annular portion formed annularly and connecting the plurality of second claw portions to one another, each of the plurality of second claw portions being disposed so as to be arranged alternately between the plurality of first claw portions;
a first magnetic collection mechanism provided so as to face the first annular portion and be spaced apart from the first annular portion, the first magnetic collection mechanism being made from a magnetic material;
a second magnetic collection mechanism provided so as to face the second annular portion and be spaced apart from the second annular portion, the second magnetic collection mechanism being made from a magnetic material;
a first magnetic sensor provided between the first magnetic collection mechanism and the second magnetic collection mechanism, the first magnetic sensor including a Hall element configured to detect a change in a magnetic field between the first magnetic collection mechanism and the second magnetic collection mechanism;
a second magnetic sensor provided between the first magnetic collection mechanism and the second magnetic collection mechanism, the second magnetic sensor including a Hall element configured to detect the change in the magnetic field between the first magnetic collection mechanism and the second magnetic collection mechanism, the second magnetic sensor being disposed at a same position as or a symmetric position to a magnetic environment of the first magnetic sensor between the first magnetic collection mechanism and the second magnetic collection mechanism; and
a third magnetic sensor provided between the first magnetic collection mechanism and the second magnetic collection mechanism, the third magnetic sensor including a Hall element configured to detect the change in the magnetic field between the first magnetic collection mechanism and the second magnetic collection mechanism, the third magnetic sensor being disposed at a same position as or a symmetric position to the magnetic environment of the first magnetic sensor and a magnetic environment of the second magnetic sensor between the first magnetic collection mechanism and the second magnetic collection mechanism,
wherein the torque sensor is structured to detect a torque generated on the rotational member based on an output signal of the first magnetic sensor, the second magnetic sensor, or the third magnetic sensor,
wherein the first magnetic collection mechanism is formed into a circular arc shape along a circumferential direction of a rotational axis of the rotational member,
wherein the second magnetic collection mechanism is formed into a circular arc shape along the circumferential direction of the rotational axis of the rotational member, and is provided so as to overlap the first magnetic collection mechanism in a direction of the rotational axis of the rotational member and in the circumferential direction and be spaced apart from the first magnetic collection mechanism in a radial direction of the rotational axis of the rotational member, and
wherein the first magnetic sensor, the second magnetic sensor, and the third magnetic sensor are provided at positions symmetric to one another with respect to the rotational axis of the rotational member.

2. The torque sensor according to claim 1,
wherein the first magnetic sensor, the second magnetic sensor, and the third magnetic sensor are disposed between the first magnetic collection mechanism and the second magnetic collection mechanism in the radial direction of the rotational axis of the rotational member.

3. The torque sensor according to claim 2, wherein the first magnetic sensor, the second magnetic sensor, and the third magnetic sensor each include an output terminal for outputting the output signal, and
wherein the output terminals of the first magnetic sensor, the second magnetic sensor, and the third magnetic sensor are provided so as to extend toward a same direction in the direction of the rotational axis of the rotational member.

4. The torque sensor according to claim 3, further comprising a single circuit substrate to which the output terminals of the first magnetic sensor, the second magnetic sensor, and the third magnetic sensor are connected.

5. The torque sensor according to claim 4, further comprising a connector portion for connecting a harness configured to electrically connect the circuit substrate and an external calculation circuit to each other,
wherein the connector portion is configured to output the output signals from the first magnetic sensor, the second magnetic sensor, and the third magnetic sensor to the calculation circuit.

6. The torque sensor according to claim 2, further comprising a holding member made from an insulating material, the holding member being configured in such a manner that the first magnetic collection mechanism and the second magnetic collection mechanism are fixed thereto.

7. The torque sensor according to claim 2, further comprising a holding member made from a resin material and formed by injection molding, the holding member fixing the first magnetic collection mechanism and the second magnetic collection mechanism by insert molding.

8. The torque sensor according to claim 7, wherein the holding member includes a gate portion for the injection molding of the holding member, and wherein the gate portion is provided at a position symmetric with respect to each of the first magnetic collection mechanism and the second magnetic collection mechanism.

9. The torque sensor according to claim 1, wherein at least two of the first magnetic sensor, the second magnetic sensor, and the third magnetic sensor are disposed on a same straight line in a direction of the magnetic field generated between the first magnetic collection mechanism and the second magnetic collection mechanism.

10. The torque sensor according to claim 1, wherein at least two of the first magnetic sensor, the second magnetic sensor, and the third magnetic sensor are provided in a same chip.

11. The torque sensor according to claim 1, wherein the first magnetic collection mechanism includes a first magnetic collection member, and a second magnetic collection member having an identical shape to the first magnetic collection member, wherein the second magnetic collection mechanism includes a third magnetic collection member provided so as to face the first magnetic collection member and be spaced apart from the first magnetic collection member, and a fourth magnetic collection member provided so as to face the second magnetic collection member and be spaced apart from the second magnetic collection member, the fourth magnetic collection member having an identical shape to the third magnetic collection member, and wherein one of the first magnetic sensor, the second magnetic sensor, and the third magnetic sensor is disposed between the first magnetic collection member and the third magnetic collection member, and at least one of the remaining two magnetic sensors is disposed between the second magnetic collection member and the fourth magnetic collection member.

12. The torque sensor according to claim 11, wherein the first magnetic collection member, the second magnetic collection member, the third magnetic collection member, and the fourth magnetic collection member are provided on a same plane orthogonal to the rotational axis of the rotational member.

13. The torque sensor according to claim 12, wherein angles of respective widths corresponding to the first magnetic collection member, the second magnetic collection member, the third magnetic collection member, and the fourth magnetic collection member in a circumferential direction of the rotational axis of the rotational member are smaller than 180 degrees.

14. The torque sensor according to claim 1, wherein the first magnetic collection mechanism and the second magnetic collection mechanism are formed symmetrically with respect to the rotational axis of the rotational member.

15. The torque sensor according to claim 1, further comprising a power source circuit, a ground circuit, and a microprocessor connected to the first magnetic sensor, the second magnetic sensor, and the third magnetic sensor, wherein at least two of the first magnetic sensor, the second magnetic sensor, and the third magnetic sensor are connected to a common power source circuit that is the power source circuit, and a common ground circuit that is the ground circuit, and wherein the microprocessor includes an abnormality detection portion configured to detect an abnormality in the power source circuit and the ground circuit.

16. The torque sensor according to claim 1, wherein the first magnetic sensor, the second magnetic sensor, and the third magnetic sensor each include an output terminal for outputting the output signal, and wherein the output terminals of the first magnetic sensor, the second magnetic sensor, and the third magnetic sensor are provided so as to extend toward a same direction in the radial direction of the rotational axis of the rotational member.

17. The torque sensor according to claim 1, further comprising an output adjustment portion configured to reduce a difference between the output signals of the first magnetic sensor, the second magnetic sensor, and the third magnetic sensor by multiplying the output signals of the first magnetic sensor, the second magnetic sensor, and the third magnetic sensor by a gain.

18. A power steering apparatus comprising:

a steering mechanism including a steering shaft including a first shaft and a second shaft connected to each other via a torsion bar and configured to rotate according to a steering operation on a steering wheel, and a rack bar configured to transmit the rotation of the steering shaft to a turning target wheel;

a torque sensor configured to detect a steering torque generated at the steering mechanism;

an electric motor configured to be controlled to be driven based on the steering torque and provide a steering force to the steering mechanism; and a control device configured to control and drive the electric motor, the torque sensor including:

a magnet provided to the first shaft rotatably according to a rotation of the first shaft, the magnet being annularly formed, the magnet being arranged in such a manner that an N pole and an S pole are disposed alternately in a circumferential direction;

a first yoke member provided to the second shaft rotatably according to a rotation of the second shaft, the first yoke member being made from a magnetic material, the first yoke member including a plurality of first claw portions, which is a plurality of plate-like members disposed so as to face the magnet, and a first annular portion formed annularly and connecting the plurality of first claw portions to one another;

a second yoke member provided to the second shaft rotatably according to the rotation of the second shaft, the second yoke member being made from a magnetic material, the second yoke member including a plurality of second claw portions, which is a plurality of plate-like members disposed so as to face the magnet, and a second annular portion formed annularly and connecting the plurality of second claw portions to one another, each of the plurality of second claw portions being disposed so as to be arranged alternately between the plurality of first claw portions;

a first magnetic collection mechanism provided so as to face the first annular portion and be spaced apart from the first annular portion, the first magnetic collection mechanism being made from a magnetic material;

a second magnetic collection mechanism provided so as to face the second annular portion and be spaced apart from the second annular portion, the second magnetic collection mechanism being made from a magnetic material;

a first magnetic sensor provided between the first magnetic collection mechanism and the second magnetic collection mechanism, the first magnetic sensor including a Hall element configured to detect a change in a magnetic field between the first magnetic collection mechanism and the second magnetic collection mechanism;

a second magnetic sensor provided between the first magnetic collection mechanism and the second magnetic collection mechanism, the second magnetic sensor including a Hall element configured to detect the change in the magnetic field between the first magnetic collection mechanism and the second magnetic collection mechanism, the second magnetic sensor being disposed at a same position as or a symmetric position to a magnetic environment of the first magnetic sensor between the first magnetic collection mechanism and the second magnetic collection mechanism; and a third magnetic sensor provided between the first magnetic collection mechanism and the second magnetic collection mechanism, the third magnetic sensor including a Hall element configured to detect the change in the magnetic field between the first magnetic collection mechanism and the second magnetic collection mechanism, the third magnetic sensor being disposed at a same position as or a symmetric position to the magnetic environment of the first magnetic sensor and a magnetic environment of the second magnetic sensor between the first magnetic collection mechanism and the second magnetic collection mechanism, wherein the first magnetic collection mechanism is formed into a circular arc shape along a circumferential direction of a rotational axis of the rotational member, wherein the second magnetic collection mechanism is formed into a circular arc shape along the circumferential direction of the rotational axis of the rotational member, and is provided so as to overlap the first magnetic collection mechanism in a direction of the rotational axis of the rotational member and in the circumferential direction and be spaced apart from the first magnetic collection mechanism in a radial direction of the rotational axis of the rotational member, and wherein the first magnetic sensor, the second magnetic sensor, and the third magnetic sensor are provided at positions symmetric to one another with respect to the rotational axis of the rotational member.

19. The power steering apparatus according to claim 18, wherein the first magnetic sensor, the second magnetic sensor, and the third magnetic sensor are disposed between the first magnetic collection mechanism and the second magnetic collection mechanism in the radial direction of the rotational axis of the rotational member.

* * * * *